Figure 1:
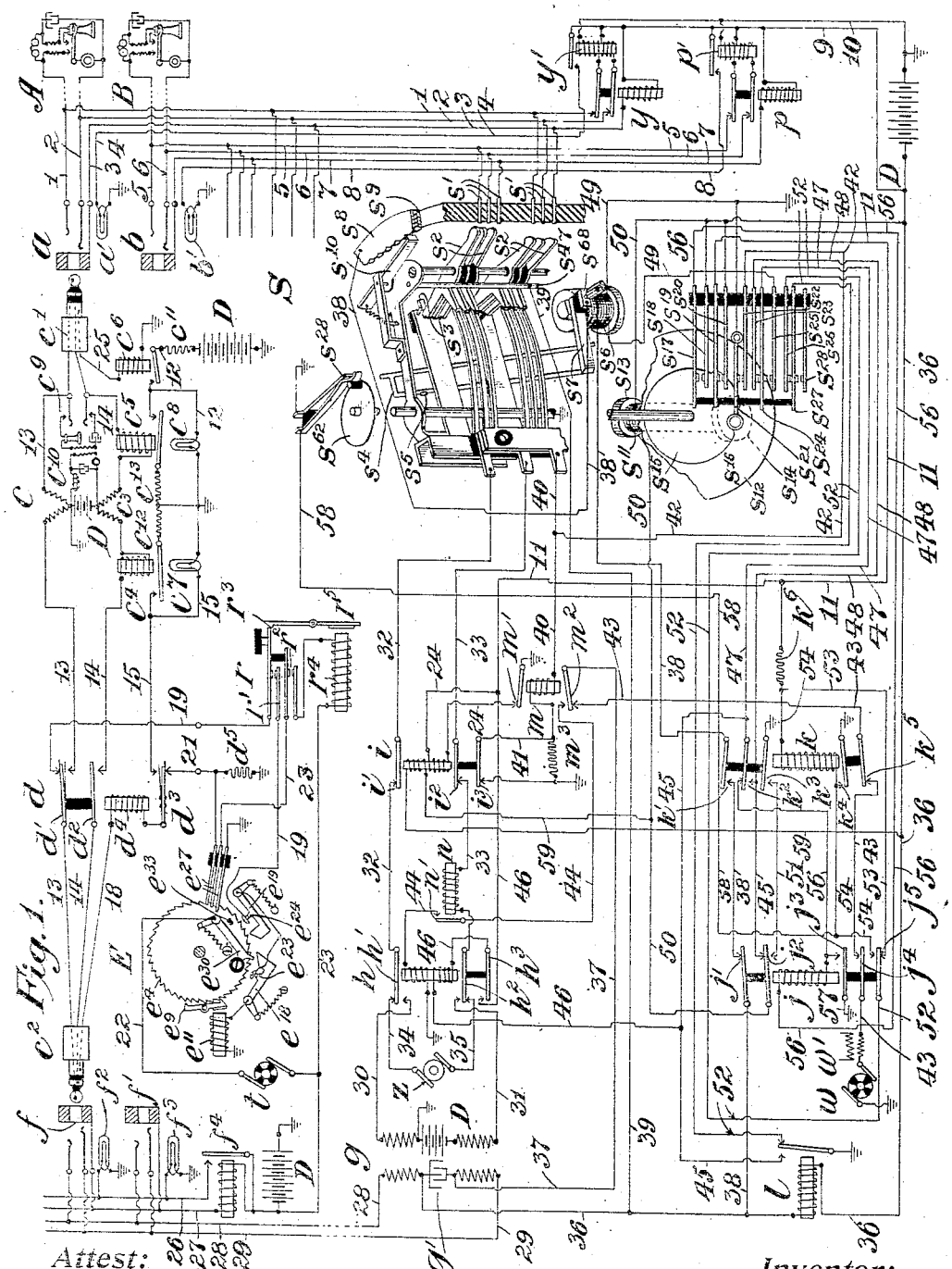

F. R. McBERTY.
CALLING DEVICE.
APPLICATION FILED FEB. 27, 1908.

1,059,944.

Patented Apr. 22, 1913.

16 SHEETS—SHEET 1.

Attest:
Edgeworth Greene
W. H. McGinnis

Inventor:
Frank R. McBerty

F. R. McBERTY.
CALLING DEVICE.
APPLICATION FILED FEB. 27, 1908.

1,059,944.

Patented Apr. 22, 1913.
16 SHEETS—SHEET 2.

F. R. McBERTY.
CALLING DEVICE.
APPLICATION FILED FEB. 27, 1908.

1,059,944.

Patented Apr. 22, 1913.
16 SHEETS—SHEET 3.

Attest:
Edgeworth Greene
W. T. McGinn

Inventor:
Frank R. McBerty

F. R. McBERTY.
CALLING DEVICE.
APPLICATION FILED FEB. 27, 1908.

1,059,944.

Patented Apr. 22, 1913.
16 SHEETS—SHEET 4.

Attest:

Inventor:
Frank R. McBerty

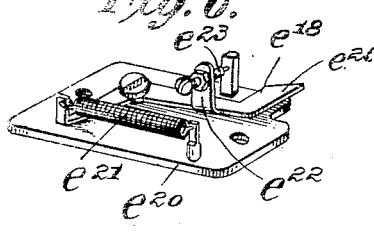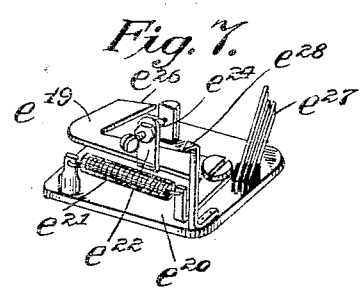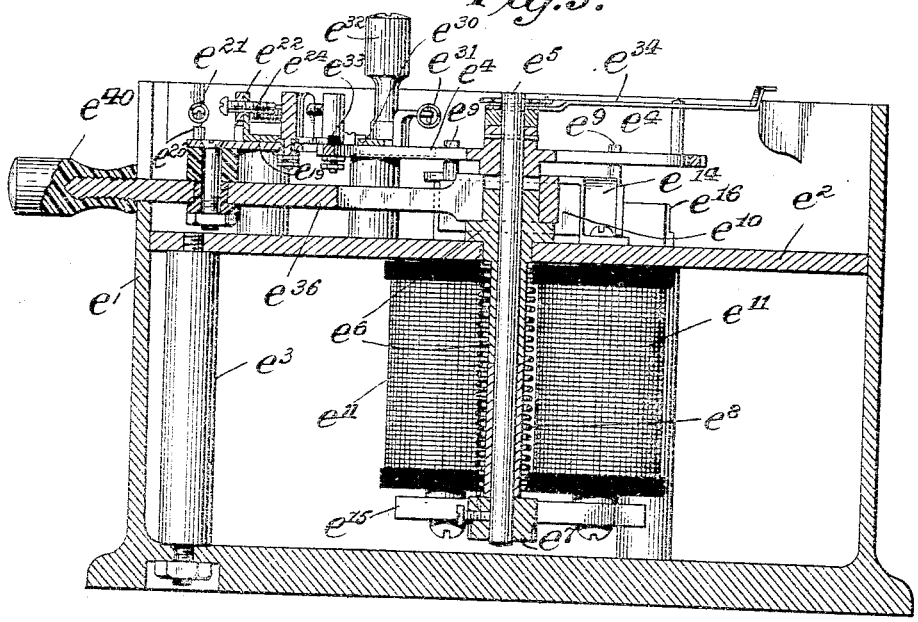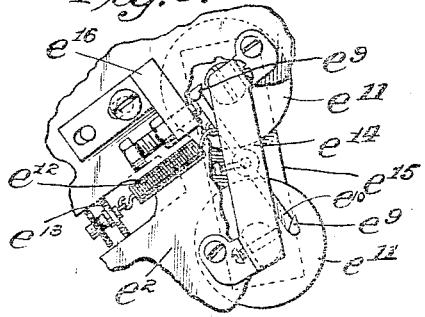

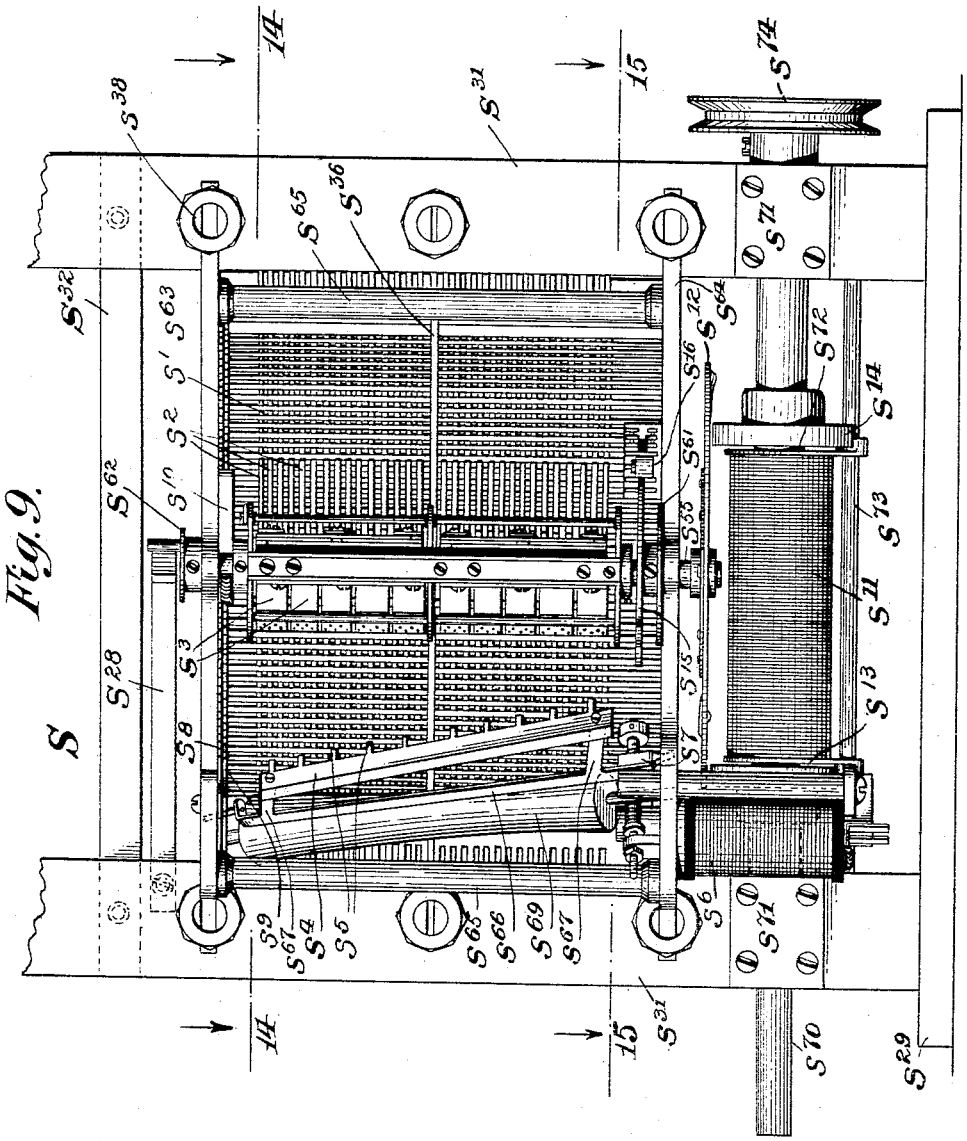

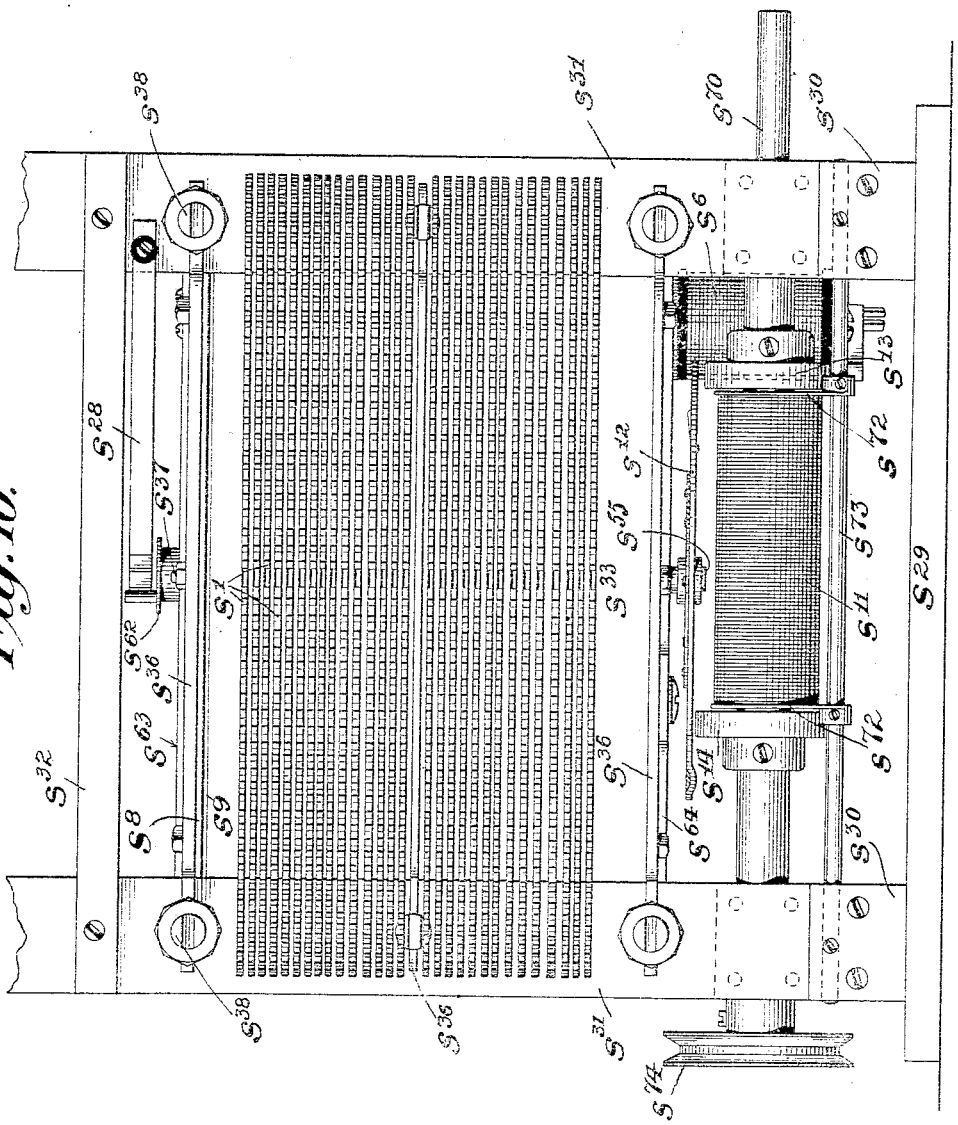

F. R. McBERTY.
CALLING DEVICE.
APPLICATION FILED FEB. 27, 1908.
1,059,944.
Patented Apr. 22, 1913.
16 SHEETS—SHEET 8.
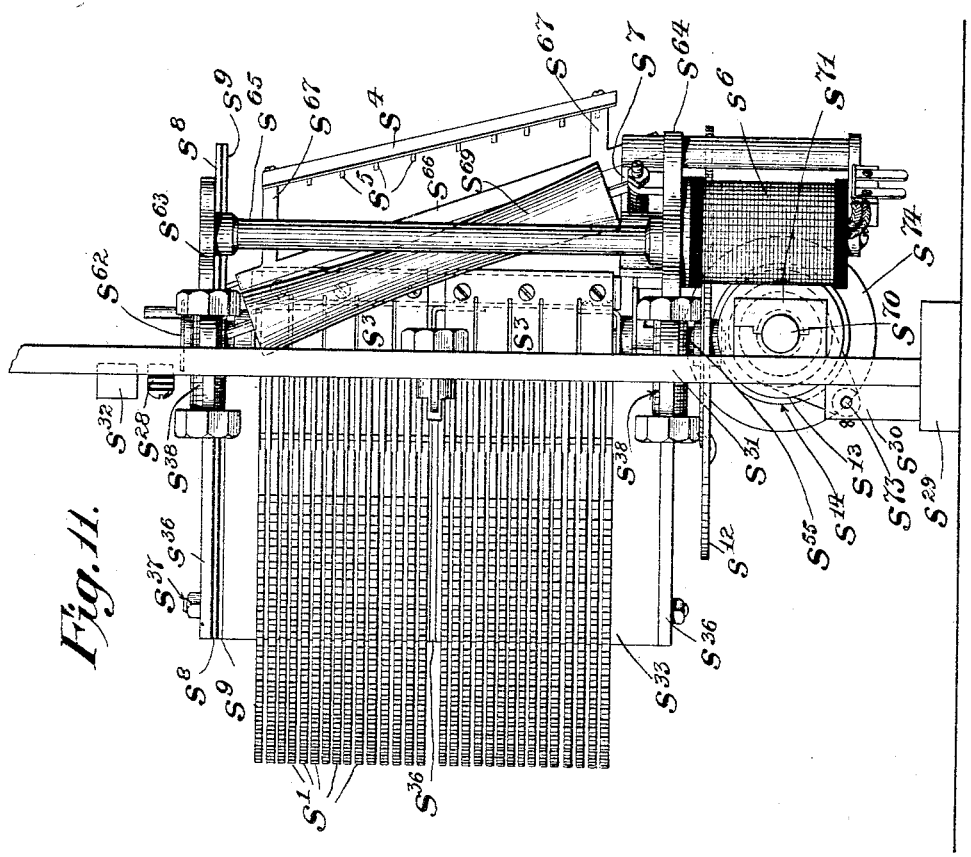

F. R. McBERTY.
CALLING DEVICE.
APPLICATION FILED FEB. 27, 1908.

1,059,944.

Patented Apr. 22, 1913.
16 SHEETS—SHEET 9.

Attest:

Inventor:

F. R. McBERTY.
CALLING DEVICE.
APPLICATION FILED FEB. 27, 1908.

1,059,944.

Patented Apr. 22, 1913.
16 SHEETS—SHEET 13.

Attest:

Inventor:
Frank R. McBerty

F. R. McBERTY.
CALLING DEVICE.
APPLICATION FILED FEB. 27, 1908.
1,059,944.
Patented Apr. 22, 1913.
16 SHEETS—SHEET 14.
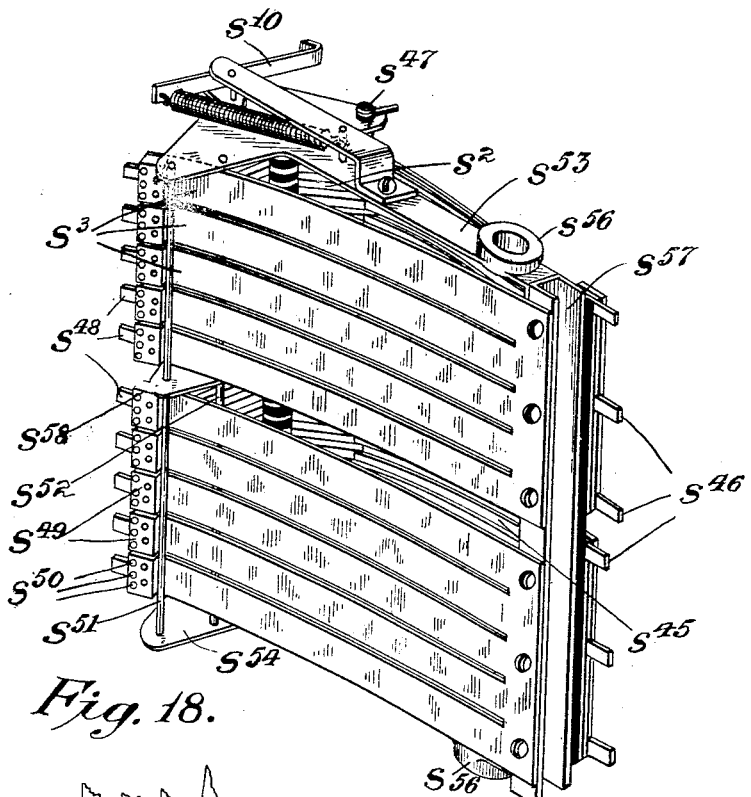
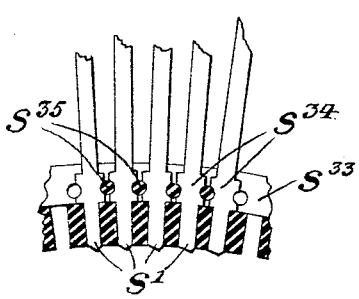
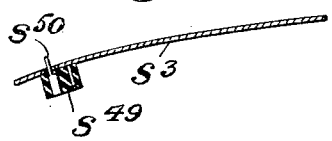
Attest:
Inventor:
Frank R. McBerty F. R. McBERTY.
CALLING DEVICE.
APPLICATION FILED FEB. 27, 1908.

1,059,944.

Patented Apr. 22, 1913.
16 SHEETS—SHEET 15.

Attest:
Edgeworth Greene
N. T. McGinn

Inventor:
Frank R. McBerty

F. R. McBERTY.
CALLING DEVICE.
APPLICATION FILED FEB. 27, 1908.

1,059,944.

Patented Apr. 22, 1913.
16 SHEETS—SHEET 16.

Attest:

Inventor:
Frank R. McBerty

UNITED STATES PATENT OFFICE.

FRANK R. McBERTY, OF NEW ROCHELLE, NEW YORK, ASSIGNOR TO WESTERN ELECTRIC COMPANY, OF CHICAGO, ILLINOIS, A CORPORATION OF ILLINOIS.

CALLING DEVICE.

1,059,944.  Specification of Letters Patent.  Patented Apr. 22, 1913.

Application filed February 27, 1908. Serial No. 418,127.

*To all whom it may concern:*

Be it known that I, FRANK R. McBERTY, a citizen of the United States, residing in the town of New Rochelle, in the county of Westchester and State of New York, have invented a certain new and useful Improvement in Calling Devices, of which the following is a full, clear, concise, and exact description.

My invention relates to a device for controlling the actuating circuits of electrically controlled mechanism, such as that which is employed in effecting the interconnection for conversation of the telephones of a telephone exchange; and it is directed more particularly toward the provision of a calling device for controlling the operation of switching mechanism located at the distant end of a circuit with which the calling device is associated, for the purpose of causing the switching mechanism to act under the control of the calling device to connect the associated circuit with any one of a number of other telephone lines or circuits.

My invention has for its principal object the provision of a simple and efficient calling device or controller of this character, which may be quickly and easily operated to govern the movement of the associated switching mechanism or automatic switch.

The calling device of my invention is of particular utility when employed in connection with the switching mechanism of a system which I shall hereinafter set forth in detail, and which has certain characteristics distinguishing it from the telephone systems of the art.

In the so called automatic telephone systems, as commonly practised, it is the custom to provide at the central office of the exchange automatic switches upon which the lines terminate, and which are adapted to effect interconnection between various lines of the exchange, these automatic switches being controlled in their operation by means of special calling apparatus located at each subscriber's station and manipulated by the subscriber to cause the automatic switches at the central office to complete the connection he desires. These systems not only necessitate the provision of special, and sometimes highly complicated, apparatus at each substation, which apparatus is usually expensive and also liable to derangement; but they also impose upon the subscriber the necessity of doing the work incident to establishing the connection between his line and the line for which he is calling. In the so called manual systems, on the other hand, no special calling apparatus need be provided at the subscriber's station, as these systems involve the employment of an operator at the central office who receives the call from the subscriber, and performs the work necessary to the establishment of the connection. But in large systems of this character, a large percentage of the calls for connection must be trunked,— that is, each call must be extended by means of a trunk line to a particular one of a number of groups into which the lines of the exchange are divided. The establishment of such a connection, therefore, involves the services of at least two operators,—the operator who first answers the subscriber and obtains from him the number of the line with which he desires connection, and the operator who presides over the distant end of the trunk line through which connection is made to the particular group in which the called line is located. The trunking of a connection involves a conversation between the subscriber's operator and the trunk operator, in which the trunk operator is apprised of the number of the line called for, and in turn informs the subscriber's operator of the number of the trunk line over which connection is to be extended. This method of completing connection between the subscribers' lines not only necessitates the employment of a large force of operators, but is also subject to objection arising from error in repeating the number of the line with which connection is desired, and in designating the number of the trunk line that is to be employed in establishing the connection.

The system in connection with which the calling device of my invention is particularly adapted to be employed aims to combine the best features of operation of the automatic system and of the manual system, and to eliminate the objectionable features of both. In accordance with the embodiment of this system which I have herein illustrated, and which I shall describe, the substation equipment is of the usual character, and does not involve any special calling apparatus. The subscribers' lines extend to a central office, where they are terminated in such a manner that a call for connection operates a signal that attracts the attention of the operator. The operator is provided with switching means for putting herself into communication with the calling subscriber and ascertaining his wants; and also with connecting means through which the line of the calling subscriber may be extended to a circuit over which his line, without any further effort on his part, and without requiring the services of another operator, may be brought into connection with the particular line for which he is calling. The circuit over which connection with the called line is established, is provided with an automatic switch which has access to connection terminals of the line with which connection is desired, and which is under the control of the calling device of my invention, which is adapted to be manipulated by the operator who answers the subscriber's call. Upon receiving the call of the calling subscriber the operator sets the calling device and when she has completed connection with the trunk line extending to the group in which the called line is included, the automatic switch at the other end of the trunk operates under the control of the calling device to select and establish connection with the particular line with which connection is desired. In this way the work which in an automatic system is performed by the subscriber himself, and which requires special calling apparatus at his substation, is, in the system with which the calling device of my invention is particularly adapted to be used, performed by the operator at the central office; while the work of completing connection with a called subscriber's line located in a particular group and at a point remote from the point where the calling subscriber is answered, which work is in a manual system performed by a trunk operator in response to spoken instruction from the subscriber's operator, is in this system accomplished by an automatic switch controlled, through the medium of the calling device of my invention, by the operator who answers the subscriber's call.

The system which I shall describe involves a number of improved and novel instrumentalities which may be used in this or in other systems. The automatic switch employed in this system is adapted to perform, under the control of the operator who answers the subscriber's call, all the work incident to selecting, testing, connecting with, ringing and disconnecting the called line which a trunk operator would perform under the verbal instructions of the answering operator; and the calling device of my invention operated by the answering operator is adapted to be set and controlled by that operator to govern the movement of the automatic switch in performing the various operations referred to above.

Briefly stated, the system in which the embodiment of my invention illustrated and described herein is particularly designed to be employed operates as follows. The act of the calling subscriber in taking his telephone for use displays a signal which leads the answering operator to complete connection with the calling line by inserting one of the plugs of a pair of connecting cords into the associated spring jack on the switchboard. When the operator has learned the number of the line with which the calling subscriber desires connection, she sets the calling device to correspond to the number of the desired line, inserts the other plug of the pair of connecting cords into the spring jack of a trunk line extending to the group of lines of which the called line is one, and presses a key which brings the calling device into operative relation with the automatic switch at the other end of the trunk line. As soon as the calling device and automatic switch are brought into operative relation a local source of power associated with the automatic switch is made operative to drive it, and the movement of the switch produces impulses that in turn serve to drive the calling device. The automatic switch has a number of rows of stationary terminals wired to the lines that terminate on the spring jacks in the switchboard, and a number of movable terminals that are caused to pass over the stationary terminals in the movement of the switch, each movable terminal being arranged to pass over a particular row of stationary terminals. While all of the movable terminals are connected with the trunk line, none of them is normally in condition to engage the terminals of the row over which it moves, but the switch is provided with mechanism that acts under the control of the calling device to select a particular one—or group—of the movable terminals, and bring it into position to engage the stationary terminals of its associated row. The particular movable terminal selected depends upon the degree to which the movable terminals—which all move together—have been displaced from their normal or resting position when the selecting mechanism operates; so, inasmuch as the automatic switch controls the movement of the calling device so that they both move together, the operator, by setting the calling device to produce, after a predetermined movement, a current change that actuates the selecting mechanism, is able to bring about the operation of the selecting mechanism of the automatic switch at any predetermined point in its movement, and is thus able to select and make active any desired one of the movable terminals. The movement of the automatic switch is stopped by the operation of mechanism associated with the switch and actuated by another current change controlled by the calling device; and, as the extent of movement of the selected movable terminal of the switch at the moment it is stopped determines the particular stationary terminal—and therefore the particular subscriber's line—with which the movable terminal of the trunk switch completes connection, the operator, by setting the calling device to produce this other current change after a predetermined movement of the calling device, is able to stop the correspondingly moving automatic switch with its selected movable terminal in engagement with any desired one of the stationary terminals. When the called line is thus selected a testing relay is brought into action to prevent the trunk line from being extended to the selected line in case the latter is busy, and to transmit a busy signal to the other end of the trunk. If the line is not busy, connection with it is completed and ringing current is applied by means of a circuit which is automatically disconnected when the called subscriber answers the call. The talking circuit of the trunk is at the same time completed at this end, and, as the devices at the other end of the trunk line have operated in the meanwhile to disconnect the calling device and complete the trunk circuit at that point, the calling subscriber and the called subscriber are now brought into communication. During the use of their telephones, both subscribers have control of the usual supervisory signals before the operator. When they replace their telephones the operator disconnects, and the resultant change of current flow in the circuit of the trunk line causes the return of the automatic switch to its normal position.

In the system in which I have illustrated the calling device of my invention to be employed, the reciprocal control over each other of the calling device and the automatic switch, the control of the called subscriber's supervisory signal, the transmission of the busy signal if the line is engaged, and the telephonic communication between the subscribers are all effected over the usual single pair of conductors. The control of the calling device over the automatic switch to cause it to perform its various operations of starting, selecting a particular movable terminal, selecting and connecting with a particular stationary terminal, and returning to normal position is effected through the medium of switching mechanism at the automatic switch end of the trunk, which operates at each change of current flow produced by the calling device to shift the control of the calling device from one to the other of the various operating circuits and mechanisms of the automatic switch.

The foregoing is an outline of the system as a whole in which the calling device of my invention is particularly designed to be employed. In order that a clear understanding of the operation of the calling device of my invention may be had, I shall fully describe the telephonic system in which I have shown it to be used in the present instance, together with the other devices which coöperate with it in this system; but it will be understood that the calling device toward which the claims of the present application are particularly directed is capable of being advantageously employed in organizations other than the particular one in connection with which it is here illustrated.

I shall describe the calling device of my invention, and the telephone system in which, in the present instance, it is employed, more in detail by reference to the accompanying drawings, wherein—

Figure 2:
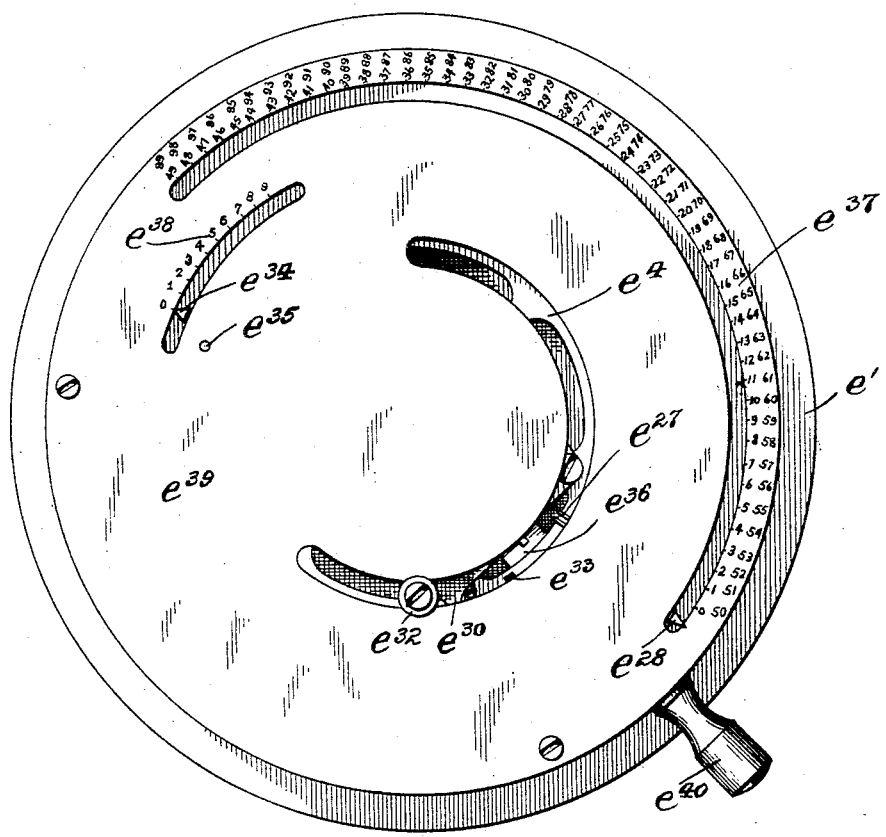
Figure 3:
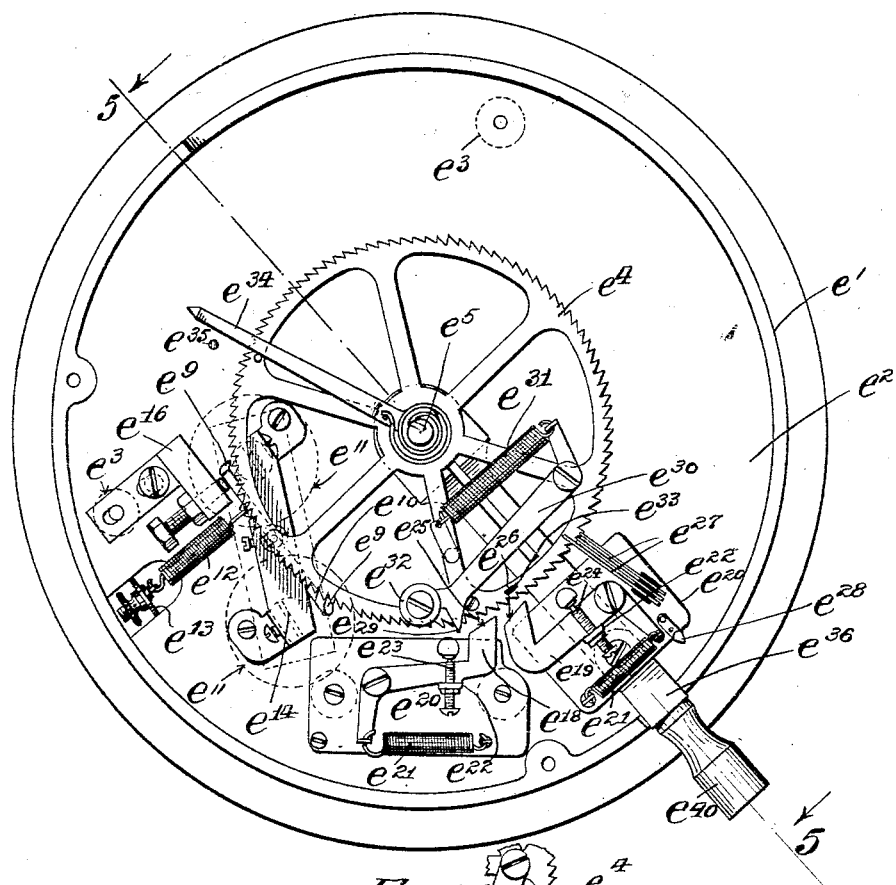
Figure 25:
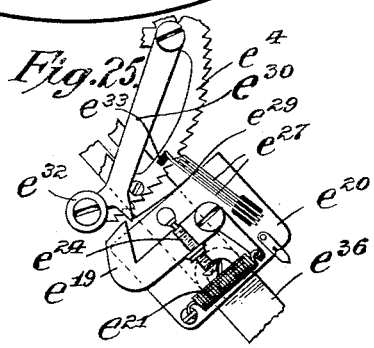
Figure 4:
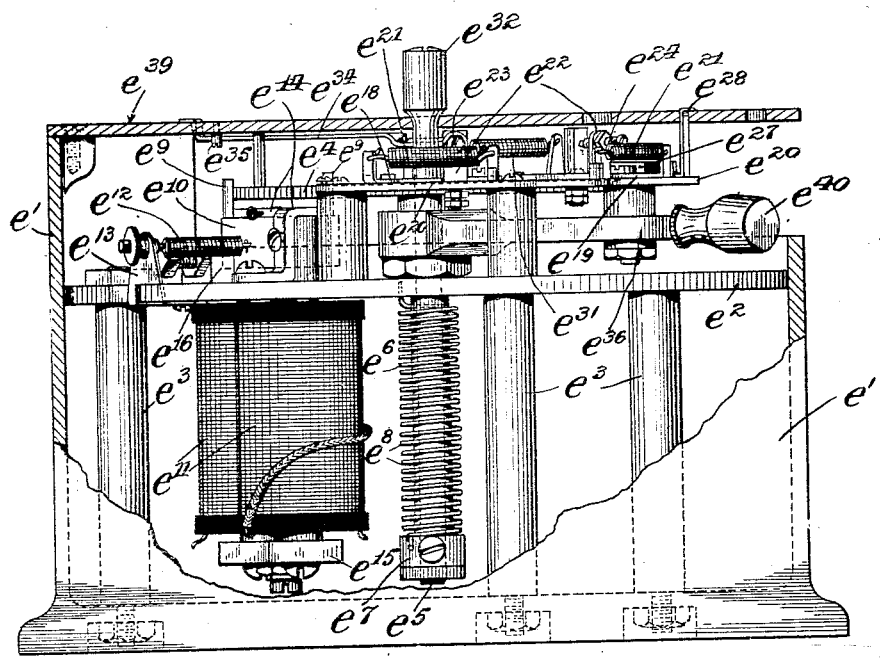
Figure 12:
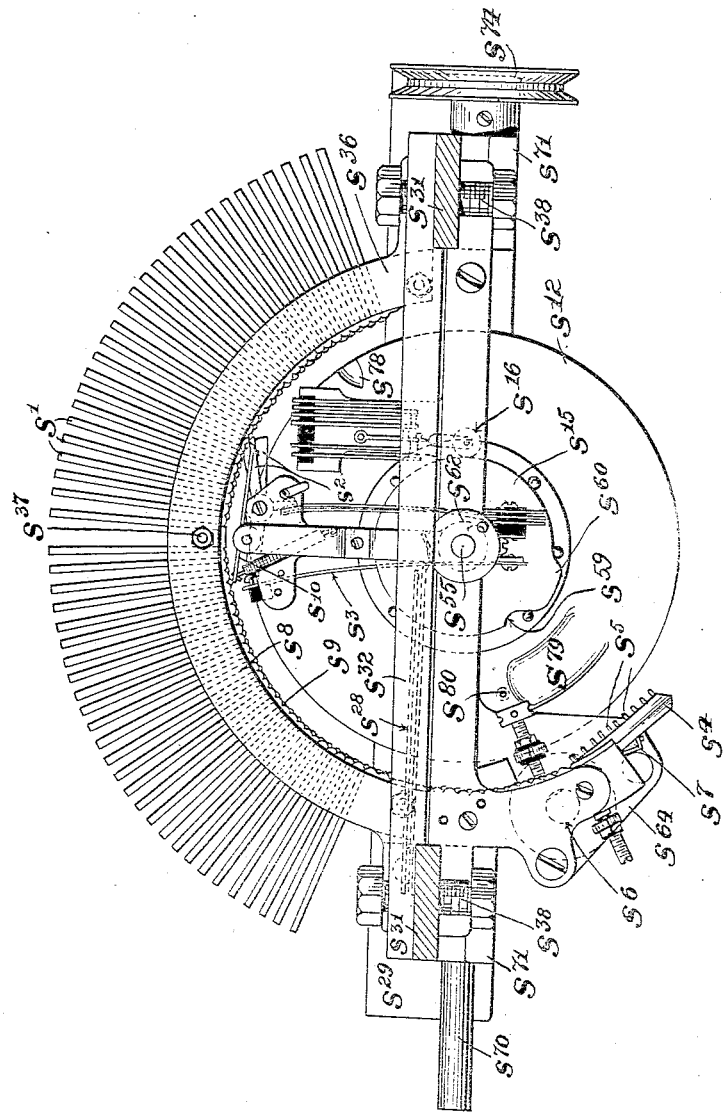
Figure 13:
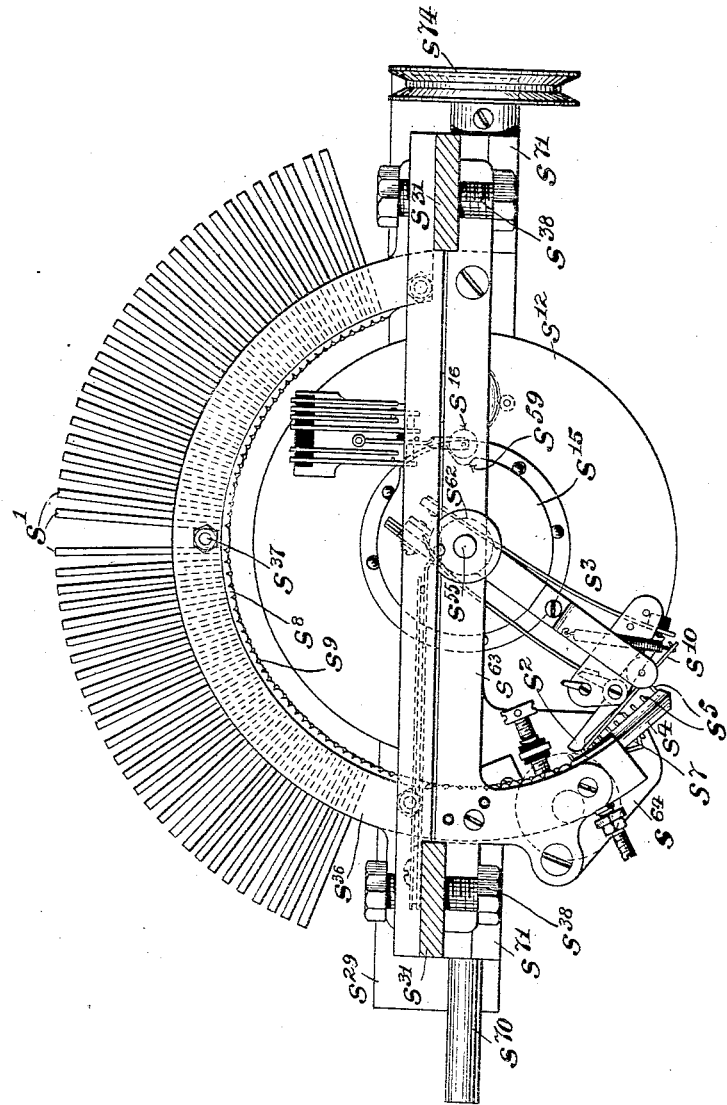
Figure 14:
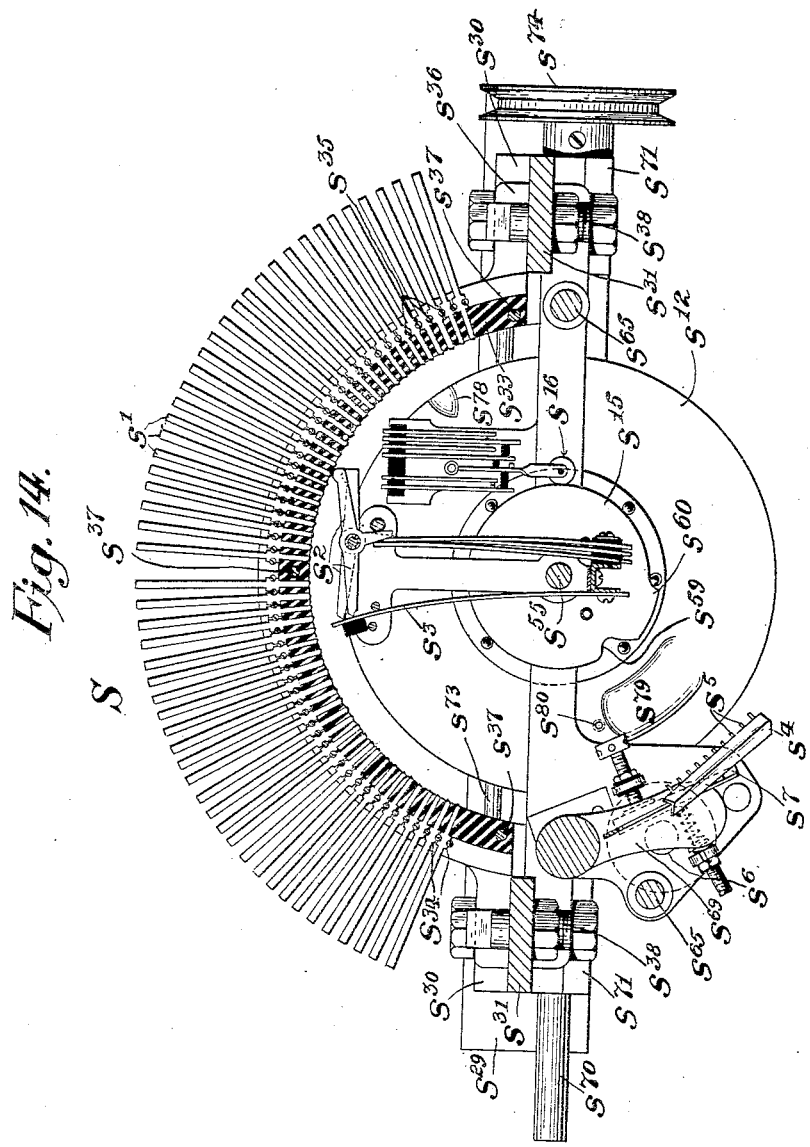
Figure 15:
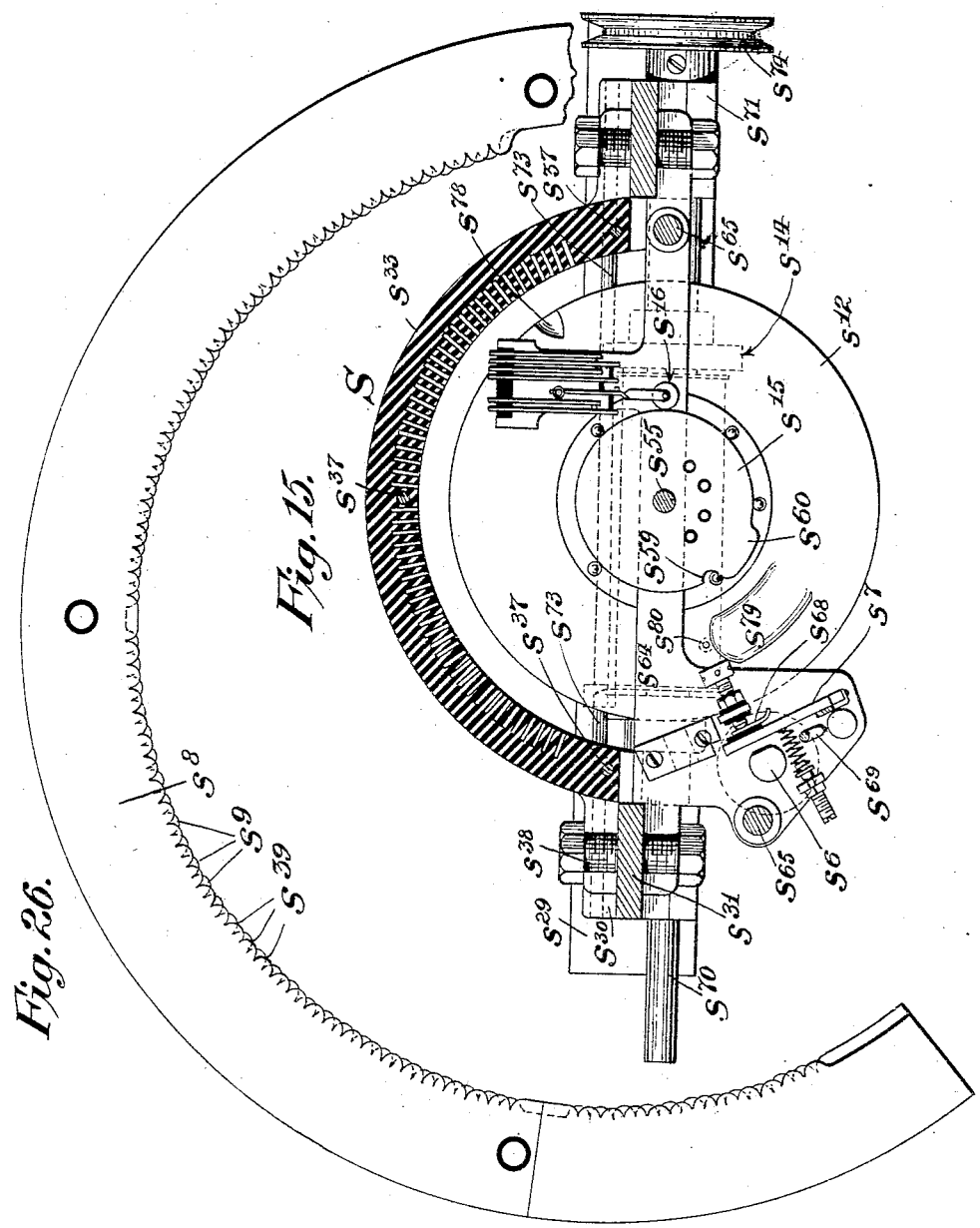
Figure 16:
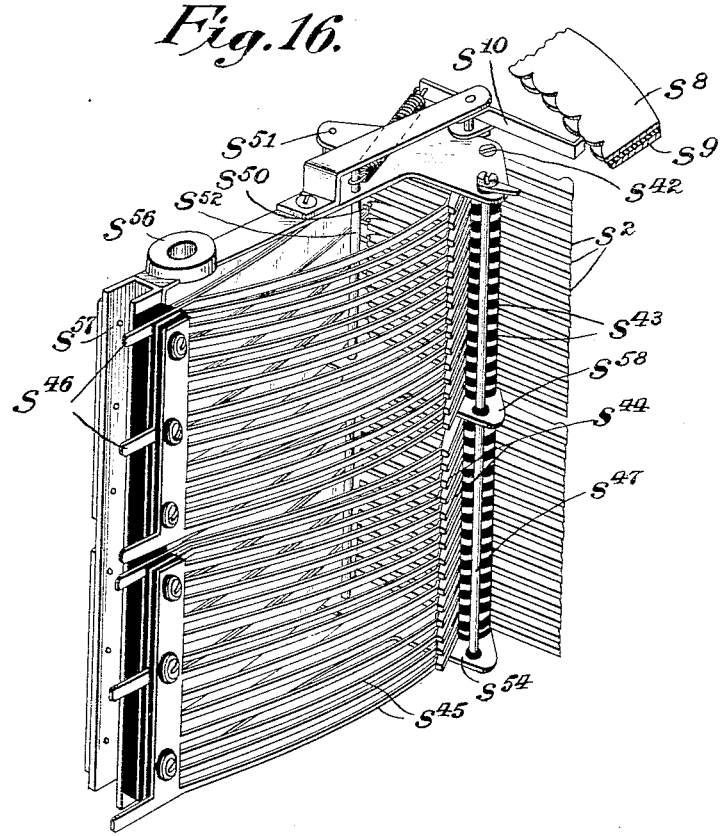
Figure 20:
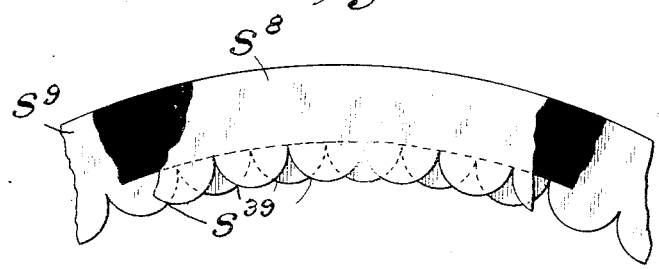
Figure 21:
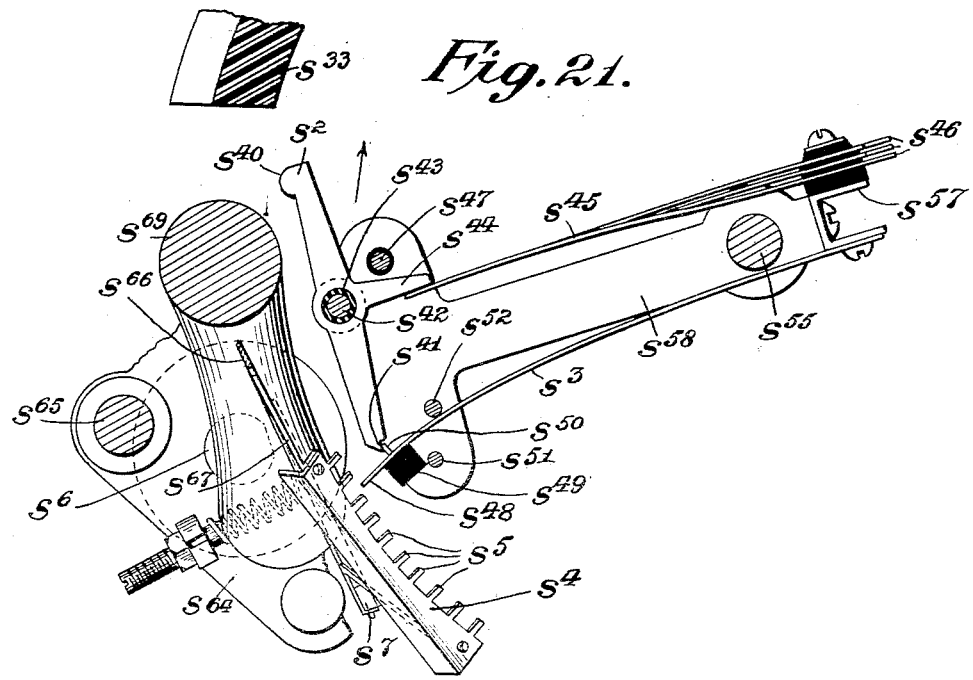
Figure 22:
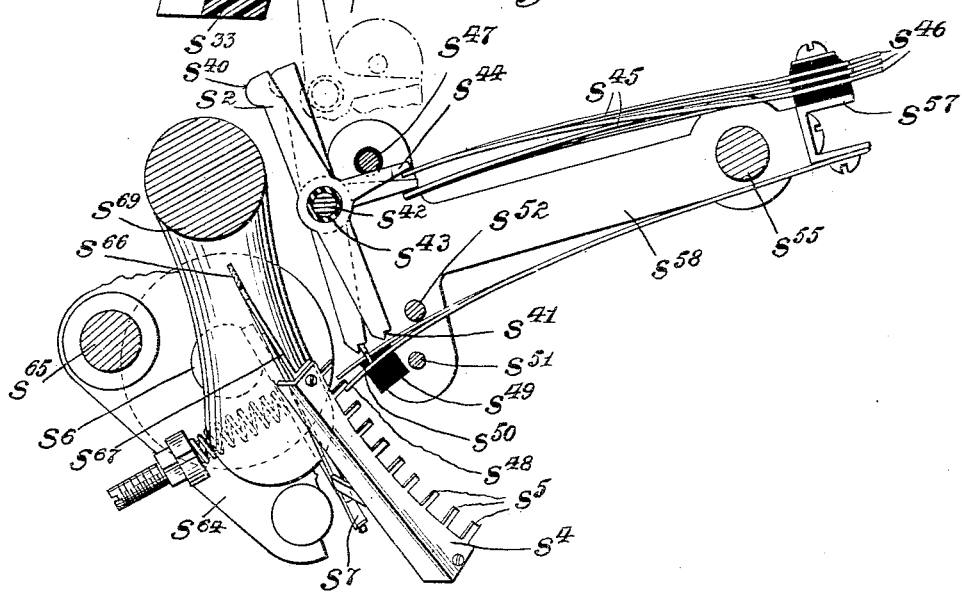
Figure 23:
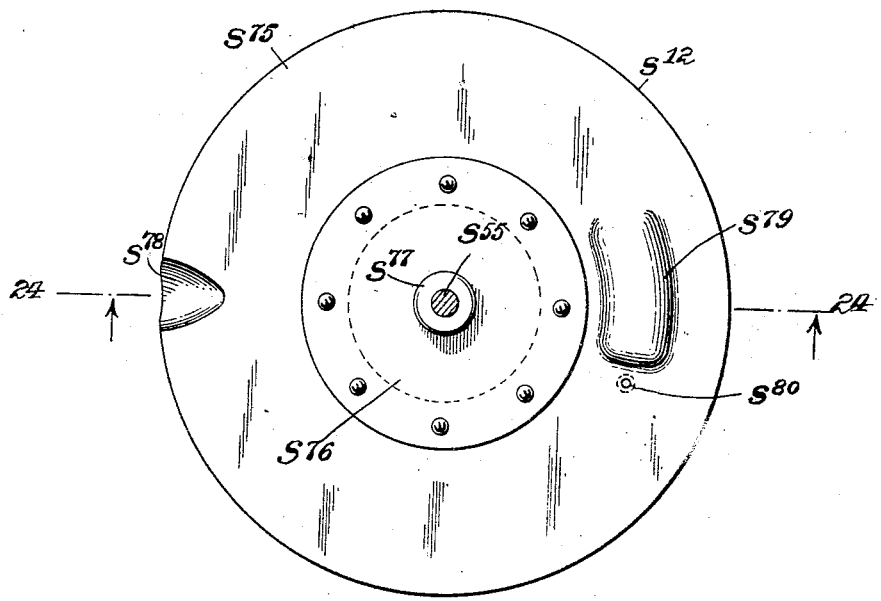
Figure 24:
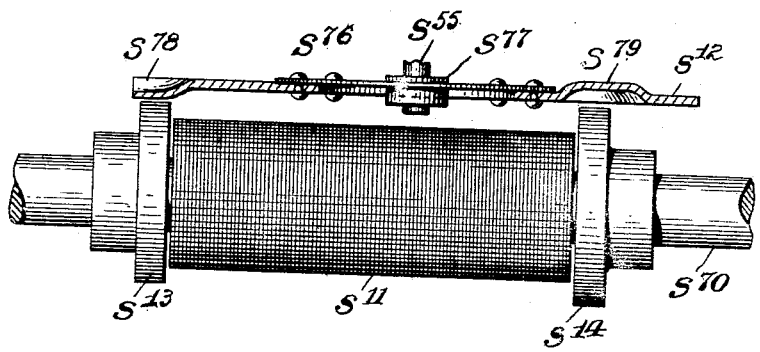

Figure 1 is a diagrammatic representation of the circuit arrangement of one form of telephone system in which the calling device of my invention may be employed; portions of the automatic switch being illustrated in perspective; Fig. 2 is a plan view of a form of calling device embodying my invention, and adapted to coöperate with the switching apparatus of my invention in the system illustrated; Fig. 3, a plan view of the calling device with the cover removed; Fig. 4, a side elevation of the calling device with the outer casing partially broken away; Fig. 5, a vertical cross section on line 5—5 of Fig. 3; Fig. 6, a perspective of the plate carrying one of the contact levers operated by the calling device; Fig. 7, a perspective view of another of the plates with its associated switches; Fig. 8, a detail plan view of the controlling magnet of the calling device with its escapement mechanism; Fig. 9, a front elevation of the automatic connector switch, the switch carriage being shown rotated off its normal position in order that the construction and arrangement of the parts may be more clearly seen; Fig. 10, a rear elevation of the automatic switch with its parts in the position shown in Fig. 9; Fig. 11, a side elevation of the switch with its parts as shown in Fig. 9; Fig. 12, a top plan view of the same; Fig. 13, a top plan view with the movable terminals of the switch in their normal position at the left hand extremity of their arc of movement; Fig. 14, a sectional plan view on line 14—14 of Fig. 9; Fig. 15, a section on line 15—15 of Fig. 9; Fig. 16, a perspective view of the switch carriage, or movable element of the switch, carrying the movable terminals with their associated parts; Fig. 17, a perspective view of the other side of the switch carriage; Fig. 18, a detail view of some of the stationary terminals of the switch; Fig. 19, a detail of one of the latches that holds the movable terminal clear of the stationary terminals; Fig. 20, an enlarged detail, partially broken away, of the interrupter segments of the switch; Figs. 21 and 22, enlarged detail views of the tripping and resetting portions of the automatic switch, Fig. 21 showing the relation between the tripping mechanism and the bank of movable terminals prior to the tripping operation, and Fig. 22 illustrating the relations between the parts at the moment of tripping, and also showing in dotted lines the tripped movable terminal as it rides up on the insulation of the terminal block in which the stationary terminals are mounted; Fig. 23, a top plan view of the disk portions of the magnetic clutch that drives the switch; Fig. 24, a front elevation of the clutch, with the disk portion shown in section on line 24—24 of Fig. 23; Fig. 25, a detail view of the contact plate shown in Fig. 7, with a portion of the escapement wheel of the calling device, to illustrate the relation between the parts when the escapement wheel is in its normal position; and Fig. 26, a top view of the interrupter segments.

*Switch.*—I shall first describe the automatic switch which is controlled by the calling device of my invention to perform the office of a trunk operator in establishing connection with the called line. This switch comprises primarily a number of stationary terminals mounted in a terminal block, a carriage or traveler carrying a number of movable terminals or brushes with means for normally holding the movable terminals or brushes clear of the stationary terminals and for measuring the movement of the carriage, a tripping device for tripping any one of the movable terminals so as to bring it into position to engage the stationary terminals in the corresponding row, a resetting device for restoring the tripped movable terminal to its normal position upon the return of the carriage or traveler, driving mechanism for causing the movement af the carriage, a magnet for controlling the operation of the driving mechanism, and a frame to which all of the above mentioned parts are secured and by means of which they are supported.

The supporting frame consists of a base piece $s^{29}$ to which two uprights $s^{31}$ are secured by means of two lugs $s^{30}$. These uprights are shown broken off at their upper ends in the drawing, as they may be made long enough to support a number of switches S arranged one above the other. Above the switch S the uprights $s^{31}$ are braced by means of a cross piece $s^{32}$. The different parts of the switch are secured to the support in three groups, any one of which may be detached from the support without disturbing the others. One of these groups includes the stationary terminals $s^1$ in their mounting block and one part of the interrupter which measures the movement of the switch carriage. The second group consists of the carriage or traveler carrying the movable terminals $s^2$, the other element of the interrupter, the tripping mechanism, a cam switch associated with the carriage, and one element of the magnetic clutch by means of which the carriage is driven. The third group comprises the power shaft and the other element of the magnetic clutch.

The stationary terminals $s^1$ consist, in the present instance, of metal punchings, which may conveniently be of brass and have the form illustrated in Fig. 18. These punchings are mounted in parallel rows in a terminal block $s^{33}$ of hard rubber, or like suitable insulating material. The terminal block $s^{33}$ is substantially semi-cylindrical in form, and for convenience in manufacture may be divided into two—or more—parts, as shown. The holes in the terminal block in which the stationary terminal punchings $s^1$ are placed may be formed in any convenient manner, but I prefer to produce them by milling a number of vertical slots in the inner face of the cylinder $s^{33}$, and a number of horizontal slots in the outer face, the series of slots being milled deep enough to intersect each other and form holes at the points of intersection. In this way, the openings of the terminal punchings are formed more readily than they would be by drilling each hole separately. The slots cut in the surfaces of the terminal block divide each surface into a series of parallel webs arranged transversely on the two surfaces. Inasmuch as the movable terminals that traverse the inner ends of the stationary terminals move across the ends and have a tendency to displace them in a horizontal direction, I cut the slots so that the webs on the inner surface of the terminal block extend vertically, so as to support the ends of the terminals against horizontal displacement; while the horizontal arrangement of the webs on the outer surface of the terminal block supports the corresponding ends of the terminals against displacement in a vertical direction by the vertically extending wires or cables connected with the outer ends of the terminals. In the present instance, I have illustrated the switch as being provided with sixteen hundred and twenty stationary terminals arranged in thirty parallel horizontal rows having fifty-four terminals in each row; and I have shown the terminal cylinder $s^{33}$ as being divided horizontally into two parts, each containing half of the terminals.

The terminal punchings $s^1$ are preferably formed with shoulders $s^{34}$ near their forward ends, as shown in Fig. 18, these shoulders being adapted to lie against the front walls of the horizontal slots in the terminal block to limit the forward movement of the terminals. The sides of the shoulders are also provided with arc shaped depressions, so that insulating rods $s^{35}$ may be thrust between vertical rows of the stationary terminals to hold them in position in the terminal block. The contact faces of the stationary terminals $s^1$ preferably project slightly beyond the plane of the inner surface of the terminal block, and are formed at such an angle that the lift of the movable terminal or brush as it passes over the projecting ends of the stationary terminal is gradual, and its movement, therefore, little impeded. By inclining the angle of the projecting portions of the stationary terminals to the movement of the movable terminals or brushes, there is also less liability of the brushes forming a bridge across and short circuiting adjacent stationary terminals.

The terminal blocks or cylinders $s^{33}$, with the terminals $s^1$ mounted therein, are secured to three arc-shaped metallic supporting strips $s^{36}$ by means of bolts $s^{37}$. The supporting strips $s^{36}$ are provided with lugs at their ends adapted to enter the slots in slotted bolts $s^{38}$ carried by the uprights $s^{31}$ of the frame, and to be clamped in position by nuts screwed upon the bolts.

Between the top of the upper terminal cylinder or block and the arc-shaped supporting strip $s^{36}$, are held two segmental plates $s^8$ and $s^9$, constituting the stationary element of the interrupter that measures the movement of the carriage over the stationary terminals. The segmental interrupter plates $s^8$ and $s^9$ are insulated from each other and from the other portions of the machine by strips of insulating material, and their front or inner edges are corrugated or scalloped as shown more plainly in Fig. 20 and Fig. 26. The two interrupter plates are so mounted that their corrugations or scallops are offset, the crest of each corrugation in one of the plates lying over the trough of the corrugation in the other plate. The corrugations in the interrupter segments correspond with the stationary terminals $s^1$ in each of the horizontal rows, and the interrupter segments are so positioned with respect to the associated stationary terminals that the troughs of the corrugations of the active segment $s^8$ lie directly over the centers of the contact faces of the stationary terminals in the horizontal rows.

In the particular switch which I have illustrated, the movable terminals $s^2$ are thirty in number, there being one for each of the thirty horizontal rows of stationary terminals $s^1$; and each of the movable terminals $s^2$ is so located as to pass over the contact faces of the stationary terminals in the corresponding row. Each of the movable terminals or brushes $s^2$ is made in the form of a lever, one extremity of which is rounded to form a contact face $s^{40}$, as shown, for instance, in Fig. 21, while the other end of the lever has a notch or shoulder $s^{41}$ adapted to coöperate with the latch $s^3$ for holding the lever normally in a retracted position. The movable terminal lever is fulcrumed at about its center upon a rod $s^{42}$, from which it is insulated by an interposed insulated bushing $s^{43}$ of hard rubber or like material, the bushing also protruding on one side of the movable terminal lever and serving as a spacer to keep it separated from the neighboring terminal lever. Each movable terminal lever $s^2$ is also provided with a laterally extending arm $s^{44}$ which engages a flat strip of metal or leaf spring $s^{45}$ that serves to give the lever a normal tendency to move in a direction to bring its contact face $s^{40}$ into engagement with the contact faces of the stationary terminals $s^1$ over which it is moved and which also serves as a conductor to connect the movable terminal with its circuit.

The movable terminal levers $s^2$ are arranged in ten sets of three levers each, and these ten sets are connected in multiple to the three conductors of the trunk with which the switch is associated. The three levers at the top of the series or gang of thirty form one set, the next three levers another set, and so on. The connection of the ten sets of movable terminal levers in multiple with the three conductors of the trunk line through the medium of the leaf springs $s^{45}$, is simplified by constructing the leaf springs so that they form the teeth of three combs punched out of sheet metal. This construction is seen most clearly in Fig. 16. The combs are punched with the space of two movable terminal levers between each tooth and its neighbor, and the teeth on the three combs are offset so as to cause the teeth of the first comb to engage the lateral arms $s^{44}$ of the first, fourth and seventh movable terminal levers, the teeth on the second comb to engage the arms on the second, fifth and eighth levers, and the teeth on the third comb to engage the arms on the third, sixth and ninth levers, and so on throughout the series. For convenience in manufacturing the particular switch which I have herein illustrated, two sets of three combs each are employed for completing connection with and bringing the requisite pressure to bear on the thirty movable terminal levers; but it will be understood that a single set of three combs, each of double the length of that shown, and with its teeth correspondingly arranged could equally well be employed. Each of the combs is provided with a terminal lug $s^{46}$ to which may be connected the conductor that joins the comb and its associated terminal levers with the trunk circuit. The combs are insulated from each other and from the frame of the machine by means of interposed thin strips of insulating material, and all are fastened together and secured to their support by machine screws separated from the combs through which they pass by means of insulating bushings.

Parallel with the fulcrum rod $s^{42}$ of the series of terminal levers, is a contact rod $s^{47}$, which is normally slightly separated from the lateral arms of the levers, and is in position to be engaged by the arms of any set of levers that is released and permitted to move under the influence of its associated leaf spring $s^{45}$. This contact rod is provided with insulating bushings where it is supported upon the frame of the carriage, and is provided with a terminal lug at its upper end by means of which a conductor may be connected with it.

Each set of three movable terminals has associated with it a latch $s^3$, by means of which its three levers are normally held with their contact faces retracted from the surface of the terminal block. Each latch $s^3$ consists of a leaf or flat strip of spring metal secured at one end to the frame of the carriage, and at that end preferably formed integrally with the like ends of the other leaf springs of the series, the springs being preferably formed by sawing deep parallel slots in a sheet of spring metal. The free extremity of each latch spring is cut down to form a tongue $s^{48}$ adapted to coöperate with the tripping device, and on the forward end of the latch spring just to the rear of this tongue is mounted a block $s^{49}$ of insulating material in which are embedded three metal pins that project loosely through the latch spring to the other side thereof, and form the catches $s^{50}$ that normally hold the three terminal levers of the set in position by engaging the notches $s^{41}$ in the ends of their rearwardly extending arms. The catches $s^{50}$ are mounted in the insulating block and insulated from each other and from the latch spring in order to prevent the three conductors extending to the sets of movable terminals from being short circuited. The backward movement of the latches $s^3$ is limited by a stop rod $s^{51}$, and the forward movement is limited by another stop rod $s^{52}$.

The movable terminals $s^2$ with all their associated parts, as described above, are supported upon the frame of the carriage or movable portion of the switch. The supporting frame consists of an upper arm $s^{53}$ and a lower arm $s^{54}$, each held to the rotating shaft $s^{55}$ of the machine by means of a set screw passing through the hub $s^{56}$, or in any other suitable manner. Each arm has a horizontally extending portion, the outer end of which is enlarged and supports the corresponding ends of the fulcrum rod $s^{42}$, the contact rod $s^{47}$, and the stop rods $s^{51}$ and $s^{52}$, and a vertically extending portion on the other side of the hub $s^{56}$, to which is secured a channel $s^{57}$ to one flange of which the springs of the latches $s^3$ are secured, and to the other flange of which are secured the combs bearing the leaf springs $s^{45}$ which connect with and apply pressure to the movable terminal levers. Intermediate the upper and lower supporting arms $s^{53}$ and $s^{54}$, is another supporting arm $s^{58}$, which is secured to the same parts of the carriage and, in the same manner as in the case of the other two arms.

On the upper arm $s^{53}$ of the supporting frame is mounted the movable element $s^{10}$ of the interrupter, the stationary element of which is made up of the two corrugated segmental plates $s^8$ and $s^9$. The movable element $s^{10}$ of the interrupter is in the form of a lever of thin sheet metal with its forward end bent outwardly, and given a tendency to press against the two segmental interrupter strips by means of a helical extension spring stretched between the other end of the interrupter lever and a pin carried by the upper supporting arm $s^{53}$. The lever is fulcrumed toward its rear end upon a pin having one end supported in the forward extremity of the arm $s^{53}$ and the other end supported in the end of a bent strip of metal also secured to the upper arm $s^{53}$. As the carriage moves, the contact brush $s^{10}$ of the interrupter is adapted, on account of the offset arrangement of the corrugated segmental plates $s^8$ and $s^9$, to ride first on one plate and then on the other, making contact with the plates alternately.

Mounted upon the rotating shaft $s^{55}$ below the carriage with its movable terminal and their associated parts, is a cam plate $s^{15}$ adapted in its rotation to operate a switch comprising in the present instance twelve switch contacts designated in the drawings $s^{17}$ through $s^{27}$, inclusive. The cam plate is provided with a central hub through which the rotating shaft passes, and which is secured to the shaft by means of a set screw, or in any other convenient manner. The cam plate $s^{15}$ is provided with a notch or depression $s^{59}$ in which the roller $s^{16}$ on the end of the actuating lever of the switch rests when the carriage is in its normal position, and with an elevated portion $s^{60}$ upon which the switch roller rides during a part of the movement of the carriage. The degree of movement imparted to the actuating member of the switch by means of the cam plate during different portions of its rotation is such that certain changes of relation of the switch contacts to each other take place in each of the three positions of the cam with respect to the roller,—that is, when the roller lies in the notch or depression $s^{59}$, when it has ridden up upon the elevated portion $s^{60}$, and when it has descended to the intermediate portion that constitutes the balance of the periphery of the cam. The contact springs of the cam plate are arranged in two banks, or double-decked and their relation to each other in the different positions of the cam with respect to their actuating member may perhaps be more clearly explained by reference to the circuit diagram of the drawing—Fig. 1—where the springs are shown spread out in a single bank or layer. When the roller rests in the notch or depression of the cam and the carriage is in its normal or home position, the springs occupy the position with relation to each other as illustrated in the circuit drawing; that is, springs $s^{17}$ and $s^{18}$, $s^{19}$ and $s^{20}$, $s^{21}$ and $s^{22}$, and $s^{24}$ and $s^{25}$, are separated from each other, while spring $s^{23}$ is in engagement with spring $s^{24}$, and spring $s^{26}$ is in engagement with spring $s^{27}$. When the roller has ridden onto the elevated portion $s^{60}$ of the cam, spring $s^{17}$ engages spring $s^{18}$, spring $s^{19}$ engages spring $s^{20}$, spring $s^{21}$ engages spring $s^{22}$, spring $s^{24}$ breaks contact with spring $s^{23}$ and engages spring $s^{25}$, and spring $s^{27}$ breaks contact with spring $s^{26}$. When the cam has been so far rotated that the roller $s^{16}$ rests upon the intermediate portion of the cam, switch spring $s^{17}$ remains in engagement with spring $s^{18}$, spring $s^{19}$ remains in engagement with spring $s^{20}$ and spring $s^{26}$ remains in engagement with spring $s^{27}$; but the actuating lever $s^{21}$ breaks contact with spring $s^{22}$, and spring $s^{24}$ breaks contact with spring $s^{25}$ but without moving into engagement with spring $s^{23}$. It will be understood that the shape of the cam $s^{15}$ may be such as to operate the switch springs in any manner desired, and at any time with respect to the movement of rotation of the switch. It will also be understood that any convenient arrangement of switch springs may be employed, the number and arrangement of the springs and their relation to the cam depending upon the requirements of the circuit used with the switch.

In the switch as illustrated, a plate or disk $s^{61}$ is secured to the shaft $s^{55}$ below the cam $s^{15}$, in order to form in the space surrounding the shaft, and between this plate or disk and the cam, a spool or bobbin upon which may wind the small cable of conductors that connects with the external circuit the contact parts associated with the movable switch carriage. The cam $s^{15}$ is provided with a number of bushed perforations, through which the conductors extend from the cable wound upon the bobbin to their terminal points upon the switch carriage. In the form of switch herein illustrated there is also provided an extra set of contacts $s^{28}$ mounted at the top of the switch frame, and operated by a small disk $s^{62}$ secured to the top of the rotating shaft $s^{55}$ and carrying an insulated part which engages and forces the springs $s^{28}$ into contact when the switch carriage is resting in its normal position. The contacts $s^{28}$ are so adjusted that they are normally closed, and are opened only after the carriage of the switch has moved far enough to cause the operation of the switch springs that are moved by the cam $s^{15}$ at the outer end of the shaft.

The switch carriage, including the movable terminals of the switch with their associated parts, and the tripping mechanism, which I shall describe hereinafter, are mounted upon a portion of the frame separated from that which carries the stationary terminals and other parts of the switch. The supporting frame for the switch carriage and the tripping mechanism consists of two metallic cross pieces $s^{63}$ and $s^{64}$ extending across the main frame parallel with each other, and secured to the uprights $s^{31}$ of the main frame by the upper and lower slotted bolts $s^{38}$. These parallel cross pieces $s^{63}$ and $s^{64}$ are held together in fixed relation independently of the main frame by means of the metal posts $s^{65}$ that extend transversely between the extremities of the cross pieces. Within the frame thus formed is fulcrumed the rotating shaft upon which the switch carriage is supported, the shaft having journals at the middle of the cross pieces $s^{63}$ and $s^{64}$.

I have heretofore referred to the latches associated one with each of the sets of movable terminals, which latches normally hold the terminals retracted and out of position for engagement with the stationary terminals over which they are moved. In order that the latches may be operated selectively to release and render active any desired set of the movable terminals, the switch is provided with electro-magnetically actuated tripping mechanism, preferably mounted, as shown, upon the portion of the frame of the switch which carries the group of movable terminals with their latches and associated parts. This tripping mechanism comprises, in the present instance, an electro-magnet, an armature therefor, and a tripping bar which is moved by the magnet through the medium of the armature. The tripping magnet $s^{6}$ is mounted upon a lateral extension of the lower cross-piece $s^{64}$ of the carriage supporting frame, the magnet depending from the lower side of the cross piece, while its core protrudes through the cross piece to form a pole piece on the upper side thereof. The lower end of the magnet is provided with a yoke which connects the core of the magnet with an iron rod constituting the return pole piece, this return pole piece lying parallel with the magnet core and the upper end protruding through the lateral extension of the cross piece $s^{64}$ upon which the magnet is supported. The cross piece $s^{64}$ is made of non-magnetic material, such as brass, to avoid short circuiting the lines of magnetic force where the magnet core and pole piece extend through it. The ends of the magnet winding are preferably led to punchings mounted upon a hard rubber terminal block secured to the yoke of the magnet.

The part of the tripping mechanism which is actively concerned in selecting and tripping any desired one of the latches associated with the sets of movable terminals, is in the form of an open frame, consisting of a supporting strip $s^{66}$ pivoted at one end in the upper cross piece $s^{63}$ and at the other end in the lower cross piece $s^{64}$, and having obliquely projecting arms $s^{67}$ upon the ends of which the tripping bar $s^4$ is secured. The tripping bar $s^4$, in order to give it greater rigidity, may be made of an angle strip, and may be provided with a number of teeth $s^5$ projecting toward the center of the switch, and arranged in horizontal planes adapted to bring them into engagement each with a corresponding one of the tongues of the tripping levers when the trip magnet is energized as the switch carriage is moved. To the lower end of the tripping frame the armature $s^7$ of the tripping magnet $s^6$ is secured. The lower end of the tripping frame is pivoted in close proximity to the upper end of the return pole piece of the magnet, and the armature $s^7$ is secured to the frame in such a way that one end is close to the return pole piece while the other end is close to the pole of the magnet. When the magnet is energized the free end of the armature is attracted to the magnet pole, thus causing the tripping frame to rock upon its pivots and thrust the tripping bar inward toward the center of the switch, where its teeth are in position to engage the latches of the movable terminal levers. The armature $s^7$ is given a normal tendency away from the pole of the tripping magnet $s^6$ by means of a helical compression spring which is interposed between the armature and a lug carried by the lower cross piece $s^{64}$. This is clearly shown in Fig. 15 of the drawing. The armature $s^7$ also carries an insulated contact piece, which in the normal position of the armature is held in engagement with an adjustable contact mounted upon but insulated from the lower cross piece $s^{64}$. This pair of contacts I have designated $s^{68}$ in the drawing.

The selective operation of any one of the ten latches by means of the single tripping device is effected by establishing such a relation between the coöperating parts that the latches pass the tripping device one after the other in the movement of the switch. As a result if the tripping mechanism is operated at a certain instant during the movement of the switch carriage, a certain latch will be tripped to release its associated movable terminals, if at another instant during the movement of the switch carriage a different set of movable terminals will be released, and so on, any particular set of terminals being selected and rendered active by causing the operation of the trip magnet at any given instant after the commencement of movement of the carriage. In the present form of switch, I have effected this relation conveniently by inclining the trip bar with respect to the line of latches with which the trip bar coöperates, so that the bar and the line of latches form an angle with respect to each other. Inasmuch as the row of latches is more conveniently arranged in a vertical line, I have found it desirable in the present instance to secure the above mentioned angular relation between the line of latches and the tripping bar by pivoting the tripping frame so that it stands obliquely with respect to the frame of the machine, the upper pivot of the frame being further advanced in a clockwise direction around the circumference of the machine than the lower pivot. The oblique line of the engaging ends of the tripping teeth is curved, as illustrated most clearly in Figs. 21 and 22, to conform to the curvature of the movement of the line of latch tongues, $s^{48}$. With the relation between the two parts established as described, as the vertical line of latches moves past the oblique line of the tripping bar in the rotation of the carriage, the point of intersection between the two is progressively shifted along the line of latches from its lower to its upper end, so that by properly timing the actuation of the tripping magnet the trip bar can be caused to come into engagement with the line of latches at any point along it from one end to the other, and thus may be caused to operate a desired one of the latches in the line. It is obvious that by arranging the latches in an oblique line and the trip bar in a vertical line the same sort of selective action of the trip bar upon the latches would be secured, as if the latches were carried past the bar one after another in the movement of rotation of the switch. Or the latches might be arranged in a horizontal line and be carried past a single tripping tooth as the switch carriage is caused to rotate about its vertical axis. But I have found it more convenient to arrange the latches in a vertical line and the tripping bar in an oblique line, as shown and described herein.

Inasmuch as the selective control of the tripping mechanism over the latches of the sets of movable terminals is dependent upon the degree of movement of the movable terminals from their normal position when the tripping mechanism is operated, it is desirable to provide mechanism for measuring accurately the movement of the switch carriage during the stage of the operation of the switch which involves the selection of a set of movable terminals, and to so locate this measuring mechanism as to establish a definite relation between it and the position of the latches of the movable terminals and the tripping bar with which it coöperates. The elements of the measuring mechanism employed for measuring the movement of the carriage during this stage of the operation, and for coöperating in the control of the tripping mechanism, are extensions of the two interrupter segments $s^8$ and $s^9$, and the interrupter brush $s^{10}$. The extensions are of the same character as the segments $s^8$ and $s^9$, which have heretofore been described, and are insulated from each other and from the frame of the machine in a similar manner. Both extensions have their inner faces corrugated, and are so mounted that the corrugations of the two segments are offset with respect to each other, the crests of the corrugations in one being opposite the troughs of the corrugations in the other, as illustrated in Fig. 20 and Fig. 26. As in the case of the main portions of the interrupter segments already described, the interrupter brush $s^{10}$ is adapted to travel in engagement with one of the segments until the engagement is broken by its being lifted from the depressed portion of one segment by engagement with an elevated portion of the other segment. In this way as the carriage with its associated interrupter brush rotates, a contact is made intermittently between the brush and one of the segments. The number of intermittent contacts made measures the extent of movement of the switch carriage and its associated parts including the movable terminals and their latches with respect to the stationary part of the switch including the stationary terminals and the tripping mechanism. The relation between the various parts is such that the contact between the interrupter brush and the active interrupter segment is broken in the movement of the switch just before the rotation of the carriage moves the latch of each set of movable terminals past the corresponding teeth of the trip bar. After the depression or trough in the active interrupter segment corresponding to the last tooth of the trip bar and its associated latch, there is an elevation or crest in the face of the segment which persists throughout the space of several corrugations, as shown in Fig. 26, and which is succeeded by the first depression in the series of corrugations that is encountered by the interrupter brush as the line of movable terminals is moved past the stationary terminals of the switch. This long elevation or crest I shall refer to as the "long tooth," and its purpose will be described hereinafter.

In order to effect the resetting of any set of movable terminals that may have been tripped, I provide a resetting device consisting of a cylinder $s^{69}$, preferably of hard rubber or like insulating material, and so locate the resetting cylinder that the faces of the movable terminals are drawn over in the last stage of the return movement of the carriage. When located in this position the faces of each set of movable terminals are carried beyond the resetting cylinder in the advance movement of the carriage before the tripping mechanism comes into operative relation with the latch that controls that set of terminals, so that the terminals are reset only in the return movement of the carriage.

As shown in the drawings, the resetting cylinder $s^{69}$ is pivoted at one end in the upper cross piece $s^{63}$ and at the other end in the lower cross piece $s^{64}$ of the frame that supports the switch carriage, the pivots being so placed that the cylinder rests in an oblique position, and at about the same angle of obliquity as the tripping frame with which it is associated. In order that the surface of the cylinder in this position may correspond in its curvature with the curvatures of the arc described by the line of movable terminal contact faces with which it engages, the cylinder is made of a diameter that gradually increases from the middle toward both ends of the cylinder. The oblique mounting of the resetting cylinder $s^{69}$ not only causes it to conform to the tripping line of the movable terminals, but it also distributes along a larger degree of the carriage movement the work of resetting the movable terminals that have been tripped.

The movement of the row of movable terminals and its associated latches and other parts past the tripping device and over the stationary terminals is effected, in the form of the switch illustrated herein, by means of power derived from a constantly rotating shaft and controlled in its application to the switch carriage by means of electro-magnetic clutch mechanism. The power shaft $s^{70}$, as shown, is fulcrumed in split bearings $s^{71}$ in the lower part of the main frame of the switch, the bearings being supported upon the two uprights $s^{31}$. The shaft $s^{70}$ is of steel, but between the fulcrums it is surrounded by a sleeve of Norway iron, which shields the shaft from the magnetic effects of the magnetizing winding, and neutralizes by its short circuiting action the effect of any permanent magnetism that may be created in the steel of the shaft. The iron sleeve carries two heads $s^{13}$ and $s^{14}$ of Norway iron, these heads being conveniently secured to the iron sleeve of the shaft by means of set screws, and constituting the pole pieces of the magnet which forms one element of the magnetic clutch. The head $s^{14}$ is preferably of somewhat greater diameter than the head $s^{13}$, for a purpose which will hereinafter be explained. Between the heads $s^{13}$ and $s^{14}$ is a magnetizing helix or winding $s^{11}$ through which the shaft with its soft iron sleeve passes loosely, the winding being placed upon a spool with metallic heads $s^{72}$ having projecting portions by means of which the spool is supported upon a transverse rod $s^{73}$ the ends of which are secured in the lugs $s^{30}$ at the base of the frame. Power is communicated to the power shaft $s^{70}$ to cause its rotation through the medium of a pulley wheel $s^{74}$ secured to the end of the shaft, or in any other convenient manner. As the shaft rotates the soft iron sleeve and the attached heads $s^{13}$ and $s^{14}$ turn with it, while the spool containing the magnetizing winding $s^{11}$, through which the shaft passes, remains stationary.

Firmly secured to the lower end of the shaft $s^{55}$ of the switch carriage is a disk or plate $s^{12}$, which serves as the armature for the electro-magnet made up of the magnetizing winding $s^{11}$, power shaft $s^{70}$ and the heads $s^{13}$ and $s^{14}$, and which constitutes the other element of the magnetic clutch that controls the application of power to the movement of the switch carriage. The armature disk or plate $s^{12}$ of the clutch magnet is most clearly illustrated in Figs. 23 and 24 of the drawing. This element of the magnetic clutch consists of a rim $s^{75}$ of soft iron with a thin plate or diaphragm $s^{76}$ conveniently made of steel, bronze, or like elastic material, riveted over the central aperture, and having at its center a collar $s^{77}$ in which the end of the shaft of the switch carriage is fastened. Two dents $s^{78}$ and $s^{79}$ are formed in the soft iron rim $s^{75}$ of the clutch magnet disk, at points that are substantially diametrically opposite each other, the dent $s^{78}$ in the normal position of the switch carriage lying directly over the head $s^{13}$ of the clutch magnet, and the dent $s^{79}$ lying directly over the head $s^{14}$. The dent $s^{78}$ is formed so as to cause a depression in the upper side of the rim $s^{75}$ of the disk and a protrusion on the under side of the disk, while the dent $s^{79}$ is formed to cause a depression on the under side of the disk and a protrusion on the upper side.

As illustrated in the drawings, the clutch magnet occupies a position somewhat offset with respect to the driven disk or plate $s^{12}$ of the switch carriage; that is, it is so mounted with respect to the disk that the head $s^{13}$ of the magnet is presented to the disk at a considerably greater distance from the center of support of the disk upon its shaft than the point at which the head $s^{14}$ of the magnet is presented. I have already stated that the head $s^{14}$ of the clutch magnet is of somewhat greater diameter than the head $s^{13}$. As a result, the disk $s^{12}$ being adapted to rotate in a plane substantially parallel to the axis of the power shaft $s^{70}$, the head $s^{14}$ normally lies closer to the plane of the surface of the disk $s^{12}$ than does the head $s^{13}$. Therefore, when the clutch magnet is energized a greater attractive force would ordinarily be developed between the head $s^{14}$ and the disk than between the head $s^{13}$ and the disk. But, as has been described, when the switch carriage is in its normal position the disk $s^{12}$ lies with the dent $s^{78}$ directly over the head $s^{13}$, and with the dent $s^{79}$ directly over the head $s^{14}$. Consequently, in the normal position of the switch carriage, the downward protuberance caused by the dent $s^{78}$ brings the rim of the disk into close relation with the head $s^{13}$, while the depression on the under side of the disk caused by the dent $s^{79}$ causes the rim of the disk to lie considerably farther than its normal distance away from the head $s^{14}$. When the clutch magnet is energized, therefore, while the switch carriage is resting in its normal position, the attractive force developed between the smaller head $s^{13}$ and the disk $s^{12}$ is considerably in excess of that developed between the larger head $s^{14}$ and the disk, and as a result the disk is drawn into engagement with the head $s^{13}$ and is tilted away from the head $s^{14}$. But, on the other hand, if the switch carriage is not resting in its normal position, the dents $s^{78}$ and $s^{79}$ no longer modify the normal relation wherein the surface of the disk lies closer to the head $s^{14}$ than the head $s^{13}$, and as a result when the clutch magnet is energized, the disk is attracted into engagement with the larger head $s^{14}$ and is tilted away from the smaller head $s^{13}$. In both cases when the clutch magnet is de-energized the elasticity of the diaphragm $s^{76}$ at the center of the disk immediately draws the disk out of engagement with the head and restores it to its normal position.

In order that the switch may operate properly, it is desirable that the element of the clutch magnet through which the power of rotation is applied to the carriage of the switch shall be free to move into and out of engagement with the rotating part, under the influence of the electro-magnetic action, but at the same time shall be rigidly connected to the shaft of the switch carriage with respect to the rotational movement thereof. This purpose is served admirably by the construction which I have illustrated and described, which involves the elastic diaphragm as the connecting medium between the shaft of the switch carriage and the armature of the magnetic clutch. This elastic connection leaves the disk free for flatwise movement into engagement with the clutch magnet, but holds it in rigid connection with the shaft of the switch carriage with respect to the edgewise movement of rotation.

I have heretofore mentioned the fact that in my preferred form of switch, as illustrated and described herein, the disk $s^{12}$ and the clutch magnet are preferably so related that the head $s^{13}$ is adapted to engage the disk at a greater distance from the center of the disk than the head $s^{14}$. This arrangement is employed for two purposes; one is to cause the switch carriage to move faster when the disk is in engagement with the head $s^{14}$ than when it is engaged with the head $s^{13}$; and the other is to keep separate the paths of engagement of the heads with the disk, so that either path may be given whatever characteristics it may require without affecting the other path. Thus the path of engagement of the head $s^{13}$ with the disk requires that at a certain point a dent $s^{78}$ of a certain form shall be provided, while the path of engagement of the head $s^{14}$ with the disk requires that at a certain point a dent $s^{79}$ of another form shall be provided. By causing the heads to engage at different distances from the center of the disk neither dent is brought into the path of movement on the disk of the head with which it is not associated. The advantage of having the switch moved faster in one direction than in the other is that the return of the movable terminal of the switch to its normal or resting position may be effected at a higher rate of speed than the advance of that terminal to connect with a particular one of the stationary terminals, the speed of advance being preferably slower to permit accurate selection of the desired stationary terminals.

The driven disk $s^{12}$ is provided with a rivet $s^{80}$ having a head which projects on the under side of the disk in close proximity to the deep end of the dent $s^{79}$, and which forms a stop for preventing the disk being driven beyond this point by the head $s^{14}$ in the return movement of the switch carriage. As has been stated before, when the switch carriage is in its normal position the dent $s^{78}$ lies directly over the head $s^{13}$ of the clutch magnet, while the dent $s^{79}$ lies directly over the head $s^{14}$, so that the energization of the magnet causes the disk to be drawn into engagement with the head $s^{13}$ and to be tilted away from the head $s^{14}$. The rotation of the power shaft $s^{70}$ is such as to cause the switch carriage to be rotated in a clockwise direction when the disk $s^{12}$ is in engagement with the head $s^{13}$, so that after the magnet has been energized the head $s^{13}$ remains in engagement with the disk and the carriage continues to be rotated from left to right until the magnet is deënergized. Upon a subsequent energization of the magnet, the surface of the disk now being closer to the head $s^{14}$ than to the head $s^{13}$, that head attracts the disk into engagement with it and tilts it away from the head $s^{13}$; and, engaging the disk as it does on the other side of its center, causes the switch carriage to move in a reverse direction, from right to left, until the disk has been rotated far enough to bring the dent $s^{78}$ over the head $s^{13}$ and the dent $s^{79}$ over the head $s^{14}$. In this position the attractive force between the head $s^{14}$,—which is driving the disk in its return movement,—and the disk is decreased, while the attractive force between the other head $s^{13}$ and the disk is augmented; and at the same time the head of the rivet $s^{80}$ is brought into position where, if the engagement between the head $s^{14}$ and the disk persists, it is interposed as a positive stop to any further return movement. In order that the magnetic attraction between the clutch magnet and the disk may cease promptly upon the cessation of current flow in the magnetizing winding $s^{11}$, I prefer to employ a construction for the clutch and its armature disk or plate such as that which I have shown and described, wherein the magnetic circuit is not completely closed during the energization of the magnet, but has a small air gap either at one pole or the other which insures prompt deümagnetization when the current ceases to circulate in the winding.

I shall now explain the operation of the form of my automatic switch which I have described.

When the switch is resting in its normal position the various parts occupy relative positions as illustrated in Fig. 13 of the drawing; that is, the switch carriage stands at the left end of its arc of movement with the line of latches $s^3$ slightly beyond the lowest tooth on the trip bar, the movable terminals are all retracted toward the center of the switch and held by their latches, the interrupter brush $s^{10}$ rests upon the dead segment $s^9$, and out of contact with the active segment $s^8$ of the interrupter, and slightly back of the first scallop or corrugation of the active segment, the roller $s^{16}$ of the cam switch lies in the notch $s^{59}$ of the cam plate, the insulated post on the disk $s^{62}$ engages the switch springs $s^{28}$ and holds them in contact, and the disk $s^{12}$ of the clutch magnet lies with the dent $s^{78}$ above the head $s^{13}$, and with the dent $s^{79}$ above the head $s^{14}$. The power shaft $s^{70}$ is constantly rotating, but causes no movement of the switch carriage so long as the clutch magnet is not energized. When energizing current flows through the winding $s^{11}$ of the clutch magnet, the disk $s^{12}$ is drawn into engagement with the head $s^{13}$ of the magnet, and the advance movement of the switch carriage in a clockwise direction commences. As the carriage starts to rotate the cam plate $s^{15}$ turns with it, and the roller $s^{16}$ of the cam switch is moved up out of the depressed portion $s^{59}$ of the cam and on to the elevated portion $s^{60}$, operating in its movement the associated switch springs $s^{17}$ through $s^{27}$, inclusive. These switch springs are so related to the movement of the actuating member of the switch that the springs $s^{19}$ and $s^{20}$ close contact with each other before the springs $s^{17}$ and $s^{18}$ come into engagement, and also before the spring $s^{24}$ breaks contact with the spring $s^{23}$. At the commencement of the movement of the switch carriage the disk $s^{62}$ at the top of the carriage shaft operates to permit the switch springs $s^{28}$ to break contact; but the engagement between these springs is adjusted to persist until after the switch springs $s^{19}$ and $s^{20}$ of the cam switch have been brought into engagement with each other. As the movement of the switch carriage continues after the operation of the switch springs, as described above, the interrupter brush $s^{10}$ is brought into engagement with the first scallop or corrugation upon the active interrupter segment. It rides over this, and part way down the other side it rides onto the first scallop or corrugation of the dead segment, $s^{9}$, and is thereupon lifted out of engagement with the active segment. It then moves over the first corrugation of the dead segment and onto the second corrugation of the active segment, off of which it is lifted by engagement with the second corrugation of the dead segment.

At the point in the movement of the switch carriage where the interrupter brush is lifted off of the second corrugation of the active interrupter segment $s^{8}$,—in the particular arrangement illustrated herein—the line of latches $s^{3}$ of the groups of movable terminals has reached a point where it is just about to pass the first or lowest tooth of the tripping bar $s^{4}$. In the continued uninterrupted movement of the switch carriage, the interrupter brush $s^{10}$ rides over the second corrugation of the dead segment onto the third corrugation of the active segment, and from it onto the third corrugation of the dead segment, breaking contact with the third corrugation of the active segment just at the instant in the movement of the switch carriage when the line of latches $s^{3}$ has reached a point when it is about to pass the second, or next to the lowest, tooth of the tripping bar $s^{4}$. As the movement of the switch carriage continues, the interrupter brush $s^{10}$ rides upon the corrugation of the active segment $s^{8}$ and the dead segment $s^{9}$ alternately and the line of latches $s^{3}$ is carried past tooth after tooth on the tripping bar, the relation between the parts being such that the interrupter brush breaks contact with a corrugation of the active segment just before the line of latches is carried past each tooth of the interrupter bar. Assuming that the group of movable terminals $s^{2}$ which is to be selected and tripped is the group located next to the upper or last group of the series—that is, the ninth group in the order in which the groups are adapted to be tripped or released—the trip magnet $s^{6}$ is energized at the instant the interrupter brush $s^{10}$ has been lifted out of engagement with the tenth corrugation of the active segment by riding onto the tenth corrugation of the dead segment. The trip bar $s^{4}$ is thereupon thrust forward to move its tripping teeth $s^{5}$ into the plane of movement of the latches, and is held in its advanced position long enough to permit the latch which is passing the point of intersection of the tripping bar and the line of the latches to be engaged and operated.

The action of the tripping mechanism in releasing the next to the last group of movable terminals, as assumed above, is illustrated in Figs. 21 and 22 of the drawings. In Fig. 21 the switch carriage with its movable terminals and line of latches $s^{3}$ and the trip bar $s^{4}$ are shown in the relative position which they occupy at the instant the interrupter brush $s^{10}$ is lifted off of the tenth corrugation of the active segment $s^{8}$ of the interrupter by its engagement with the tenth corrugation of the dead segment $s^{9}$. Fig. 22 illustrates the changed condition which is produced a moment later by the action of the trip magnet in thrusting the trip bar $s^{4}$ forward so as to bring its ninth tooth $s^{5}$ into the path of movement of the ninth latch $s^{3}$ as the switch carriage is carried in its continued rotation into the slightly farther advanced position in which it is shown. As the switch carriage moves forward it may be seen from the illustration that the latch is held in a stationary position by the tooth which it engages so that the catches $s^{50}$ are withdrawn from the ends of the levers of the movable terminals, permitting them to thrust their contact faces forward until their movement is stopped by the engagement of their lateral extensions $s^{44}$ with the contact rod $s^{47}$. An instant later the trip magnet is deënergized so as to permit the retraction of the trip bar $s^{4}$ and prevent the tripping of the next latch as it is moved past the bar. As the switch carriage continues to move after the tripping of a particular set of movable terminals $s^{2}$, the interrupter brush $s^{10}$ is carried past the last scallop or corrugation on the extension of the dead interrupter segment $s^{9}$, and onto an elevation of the active segment $s^{8}$ which extends over a space of several corrugations at the point where the main portions and the extensions of the interrupter segments join. This long elevation of the active segment $s^{8}$ I term the "long tooth." During the stage of movement of the carriage in which the interrupter brush $s^{10}$ is moving over the face of the long tooth, the cam disk $s^{15}$ is rotated into position where the roller $s^{16}$ of the cam switch is permitted to ride down off of the elevated portion $s^{60}$ of the cam and onto the portion having an intermediate elevation, this movement of the cam switch occurring just before the interrupter brush leaves the long tooth. This movement of the cam switch produces a number of changes in the relation of its switch springs to each other, which changes I have described hereinbefore. The set of movable terminals which, from the moment they are tripped, have been lying in engagement with the contact rod $s^{47}$, ride up on the insulation of the stationary terminal block $s^{33}$ just before the movement of the carriage has carried the interrupter brush off of the long tooth, and are tilted so as to interrupt their engagement with the contact rod $s^{47}$. Beyond the long tooth the movement of the switch carriage carries the interrupter brush over alternately arranged corrugations of the active segment $s^{8}$ and the dead segment $s^{9}$; and at the same time causes the movable terminals $s^{2}$ to traverse the stationary terminals $s^{1}$, the movable terminals of the group that has been tripped being in position to make contact with the stationary terminals of the rows over which they pass, and the other movable terminals of the series being held clear of the stationary terminals in their corresponding rows. The relation between the corrugations of the active and dead interrupter segments and the vertical rows of stationary terminals on the one hand, and the interrupter brush and movable terminals on the other hand, is such in the particular form of my switch which I am describing that each elevated portion of the dead corrugated segment $s^{9}$—that is, each depressed portion of the active corrugated segment $s^{8}$—lies directly above one of the vertical rows into which the stationary terminals fall. The interrupter segments have as many operative points as there are vertical rows of stationary terminals, there being, in the form of switch illustrated, an operative point—that is, a point where the operative relation between the contacts of the interrupter is changed—above each of the vertical rows of stationary terminals. The interrupter brush has a fixed relation to the single vertical row of movable terminals with which it is associated, so that as the single row of movable terminals comes into operative relation with each of the vertical rows of stationary terminals, one after the other, the single movable member, or brush, of the interrupter comes into operative relation with that operative point upon the stationary member of the interrupter which corresponds to the vertical row of stationary terminals over which the movable terminals are passing. This arrangement makes it possible to obtain an exact correspondence between the operative points of the interrupter and the associated rows of stationary terminals, so that the position of the movable member of the interrupter upon its stationary member is accurately representative of the position of the movable switch terminal upon the associated row of stationary terminals, regardless of how the individual terminals may be spaced with relation to each other. The movement of the switch carriage continues uninterrupted until, by the movement of the interrupter brush $s^{10}$ off of one or another of the series of corrugations of the active segment and on to the corresponding corrugation of the dead segment, the clutch magnet $s^{11}$ is deprived of energizing currents, and the carriage comes to rest with its selected and tripped movable terminals in contact with the stationary terminals of the corresponding horizontal rows that lie in the vertical line on which the interrupter and line of movable terminals has stopped.

Assuming that the upper or tenth group of movable terminals has been tripped, and that the clutch magnet is deprived of current and the switch brought to rest with the selected terminals in contact with the thirty-sixth in order of the stationary terminals in the corresponding rows, then the appearance of the switch will be as illustrated in Figs. 9, 10, 11, 12, 14 and 15 of the drawing. It will be seen by reference to Figs. 9 and 10 of the drawing that when the switch is resting in this position the disk or plate $s^{12}$ of the clutch magnet lies closer to the head $s^{14}$ of the magnet than to the head $s^{13}$, so that when the clutch magnet is again energized the disk $s^{12}$ is drawn into engagement with the head $s^{14}$, and the switch carriage is consequently moved in a reverse direction back toward its normal position. As the carriage returns, the selected movable terminals are trailed over the stationary terminals in their corresponding rows, the interrupter brush $s^{10}$ is moved over the interrupter segments, and the cam switch moves its springs as the roller $s^{16}$ rides on to the elevated portion of the cam plate; but the circuit condition is such that these changes of the switch parts are ineffective to interfere with the operation. The backward movement of the switch carriage draws the contact faces of the selected movable terminals across the surface of the resetting cylinder $s^{69}$, which thrusts the movable terminal levers into position where they are again engaged by their latches and held in their normal position. The return movement continues until the whole row of movable terminals has been carried across the face of the resetting cylinder to reset whichever terminals have been tripped, until the interrupter brush $s^{10}$ has been carried beyond the last corrugation of the active segment $s^8$, and until the disk $s^{12}$ of the clutch magnet has been rotated to a position where the dent $s^{78}$ lies above the head $s^{13}$ of the magnet and the dent $s^{79}$ above the head $s^{14}$. When this relation of the parts has been arrived at, the roller $s^{16}$ of the cam switch descends into the notch $s^{59}$ of the cam plate, and the switch is operated to deprive the clutch magnet of energizing current and permit it to release the disk $s^{12}$, thus bringing the carriage to rest in its normal position.

I shall now describe the calling device which I have devised for use in controlling the operation of automatic switching mechanism such as that described above. One form of this calling device is illustrated in Figs. 2, 3, 4, 5, 6, 7, 8 and 25 of the drawing. The calling device illustrated is designed to be set to operate contacts associated with it at certain predetermined intervals in the movement of the switch, and to have its movement governed by electrically actuated mechanism which in turn is operated by the flow of current in the circuit which the calling device itself controls. Generally speaking, this calling device comprises contact mechanism adapted to be operated as many times in the course of the movement of the calling device as there are selecting operations to be effected in the switch controlled by the calling device, a moving part arranged to operate the contact mechanism in the movement of the part and to operate it at intervals in the movement that may be predetermined by setting the contact mechanism and the moving part to have any desired relation to each other, and mechanism actuated by an electro-magnet under the control of the distant switch for governing the movement of the part and consequently the operation of the contact mechanism of the calling device. The calling device is also provided with switch parts for controlling electric circuits designed at certain stages in its operation to automatically render effective means for causing the continued movement of the switch while the source of energy which normally effects its movement is disconnected.

Considered specifically, the embodiment of my calling device illustrated herein comprises a cylindrical casing $e^1$ within which is mounted a frame plate $e^2$ supported on rods $e^3$ secured to the base of the casing, the frame plate carrying the various operative elements of the calling device. In the center of the frame plate an escapement wheel $e^4$ is pinned to the upper end of a shaft $e^5$ which protrudes through a tubular stem $e^6$ screwed into the frame plate, the tubular stem forming a bearing for the shaft. The tubular stem surrounds all but the lower end of the portion of the shaft $e^5$ which projects through the frame plate, and upon the end of the shaft which extends beyond the tubular stem a collar $e^7$ is fastened by means of a set screw. A helical spring $e^8$ is coiled about the tubular stem and has one end secured on the collar $e^7$ and the other end in the frame plate $e^2$, the spring being twisted to produce a tendency for the escapement wheel to rotate in a counter-clockwise direction. Associated with the escapement wheel $e^4$ is an escapement $e^9$ consisting in the present instance of two pins mounted upon opposite ends of the armature $e^{10}$ of an electro-magnet $e^{11}$, and adjusted to be thrust into and withdrawn from the teeth of the escapement wheel in alternation in the movement of the armature. The armature is normally held away from the pole pieces of the electro-magnet, and one pin of the escapement held in engagement with a tooth of the escapement wheel, by means of a helical extension spring $e^{12}$, one end of which is secured to the armature $e^{10}$ while the other end is adjustably secured to a lug $e^{13}$ fastened to the frame plate. The armature $e^{10}$ of the magnet that controls the escapement is secured at its middle to a transverse rod the upper end of which is pivoted in a supporting bridge $e^{14}$ that is fastened to and extends between the poles of the magnet $e^{11}$, while the other end is pivoted upon a pivot screw which extends through the center of the yoke piece $e^{15}$ of the magnet. The supporting bridge $e^{14}$ consists of a piece of non-magnetic metal that lies flat across the tops of the pole pieces of the magnet, is bent down along the side of each pole piece, and is bent again at each end at right angles so as to form feet for supporting itself upon the top of the frame plate. The pole pieces of the magnet $e^{11}$ extend loosely through holes in the frame plate, and are fastened to the bridge piece $e^{14}$ by means of screws which pass through the vertical portions of the bridge piece and into the faces of the pole pieces opposite the faces which attract the armature. An adjustable stop, $e^{16}$ consisting of an angular lug fastened to the top of the frame plate and having an adjusting screw extending horizontally through one of its arms, is provided to limit the backward movement of the armature.

The switch mechanism of the calling device comprises two contact devices illustrated in perspective in Figs. 6 and 7 of the drawing. Each of these contact devices consists primarily of a contact lever $e^{18}$, $e^{19}$, respectively, conveniently formed of a metal punching having its two arms at an angle to each other and pivoted at the angle of the arms to a flat plate $e^{20}$. Each of the contact levers has a helical extension spring $e^{21}$ extending between an upturned portion at one end of the lever arm and a pin or abutment upon the associated contact plate $e^{20}$, and each contact lever is provided with an upturned portion $e^{22}$ on its other arm bearing an adjustable platinum tipped screw, which is adapted to be held pressed against a coöperating contact post mounted upon but insulated from the plate $e^{20}$ to constitute the contact $e^{23}$ of the contact lever $e^{18}$ and the contact $e^{24}$ of the contact lever $e^{19}$, respectively. The extreme end of each of the contact levers $e^{18}$ and $e^{19}$ is formed to extend at an angle to the arm of the lever of which it forms a part, and to project beyond the plate upon which the lever is mounted and into position to be engaged by a part carried by the escapement wheel. The face of each of these protruding portions $e^{25}$ and $e^{26}$ of the levers $e^{18}$ and $e^{19}$, respectively, is preferably formed to present an inclined plane to be engaged by the part carried by the escapement wheel, so that the lever may be gradually lifted in the advance of the wheel as the moving part engages the end of the lever. It is of course obvious that the levers $e^{18}$ and $e^{19}$ with their associated parts may be constructed in a variety of forms which will equally well secure the operation for which they are designed. The plate $e^{20}$ illustrated in Fig. 7, in addition to its contact lever $e^{19}$ with its associated parts, carries a group of switch springs $e^{27}$, consisting of three springs mounted upon but insulated from the plate $e^{20}$, and normally separated from each other, but adapted to be thrust into contact with each other when engaged by a part carried by the escapement wheel $e^4$. This plate also carries a pointer or index finger $e^{28}$, the purpose of which will be explained later.

The means by which the escapement wheel $e^4$ in its movement causes the operation of the contact levers $e^{18}$ and $e^{19}$ described above, consists of the projecting nose $e^{29}$ of a lever $e^{30}$ which is secured to the escapement wheel at the other end of the lever so as to be capable of swinging through a small arc. A short arm extending laterally from the fulcrumed end of the lever is connected with the escapement wheel by means of an extension spring $e^{31}$, so that the lever is normally held in position with the nose $e^{29}$ protruding slightly beyond the periphery of the escapement wheel and in position to engage the contact faces $e^{25}$ and $e^{26}$ of the contact levers as it is carried past them. The tension of the extension spring $e^{31}$ is so adjusted that the contact levers $e^{18}$ and $e^{19}$ yield upon engagement of their contact faces by the nose $e^{29}$, rather than the lever $e^{30}$. The protrusion of the nose of the lever $e^{30}$ is limited by a stop on the escapement wheel against which the free end of the lever $e^{30}$ normally rests. The free end of the lever $e^{30}$ is provided with a handle $e^{32}$ by means of which the nose $e^{29}$ may be drawn in toward the center of the escapement wheel, and the escapement at the same time rotated in a clockwise direction. On the periphery of the escapement wheel there is mounted an insulated stud $e^{33}$ which is so placed with relation to the nose $e^{29}$ of the lever $e^{30}$, and with relation to the distance between the point of the protruding contact face of lever $e^{19}$ and the group of switch springs $e^{27}$, that it, the stud, engages and forces into contact with each other the switch springs $e^{27}$ at the moment the nose $e^{29}$ passes from under the face of the lever $e^{19}$ and permits the lever to fall back to its normal position. The relation which exists between these parts when the escapement wheel is in its normal position is shown in Fig. 25 of the drawing. The escapement wheel also carries a pin which coöperates with an index arm $e^{34}$ the purpose of which will be explained later. This index arm $e^{34}$ is fulcrumed at one end upon the upper end of the shaft or arbor $e^5$ of the escapement wheel, and is yieldingly connected with the shaft by means of a spiral spring which tends to produce a movement of the index arm in a counter-clockwise direction and to hold the arm yieldingly against its abutment pin on the escapement wheel. Another abutment or stop pin $e^{35}$ is provided to limit the movement in a counter-clockwise direction of the index arm $e^{34}$, this pin being mounted on the frame plate $e^{39}$. As a result of this arrangement, the index arm $e^{34}$ is moved positively with the escapement wheel in a clockwise direction after the stop pin on the wheel has come into contact with the arm, but is prevented from following the movement of the escapement wheel in a counter-clockwise direction beyond the point where the arm engages the stop pin $e^{35}$.

I have heretofore stated that the relation between the moving part of the calling device and the contact mechanism is capable of adjustment so that the operation of the contact mechanism by the moving part may occur at any predetermined interval, or intervals, after the commencement of the movement of the device. This result I secure in the embodiment of my calling device illustrated herein by mounting one of the contact plates $e^{20}$ with its associated parts so that it is movable with respect to the other contact plate, and by constructing the device so that its moving part may be adjusted to move through any predetermined distance before coming into engagement with and operating the switch lever on the first of the two plates $e^{20}$ which it encounters. In this way the moving part may be set to move through any predetermined degree of its movement before operating the first set of contacts, and through any other predetermined degree before operating the next set of contacts. It is obvious that a series of contacts, if desired, might be provided and arranged to be operated at predetermined intervals in the same manner; also that the commencement of movement of the moving part might be from a fixed point with relation to which the contact devices would be adjustable, so as to provide for their actuation at the intervals desired. In the present instance, I prefer to mount immovably upon the frame the plate bearing the contact lever $e^{18}$, and to mount the plate bearing the contact lever $e^{19}$ upon an arm $e^{36}$ by means of which the plate may be swung to any desired degree around the periphery of the escapement wheel $e^4$. Each contact plate $e^{20}$ with its associated switch parts is insulated from the metallic part upon which it is mounted, preferably by being supported on columns of insulating material. The arm $e^{36}$ upon which the contact plate bearing the contact lever $e^{19}$ is mounted is fulcrumed upon the upper end of the tubular stem $e^6$ which protrudes through the frame plate of the calling device and forms a bearing for the shaft $e^5$ of the escapement wheel. The end of the arm $e^{36}$ engaging the top of the tubular stem $e^6$ is split part way so that the two halves embrace the stem closely, and produce a frictional engagement which holds the arm securely in any position to which it may be adjusted.

The extent of displacement of the plate bearing the contact lever $e^{19}$ and carried by the supporting arm $e^{36}$, and the extent of displacement of the escapement wheel from its normal position when it is rotated manually by means of the handle $e^{32}$ in a clockwise direction, are indicated by the movement of the index fingers or pointers $e^{28}$ and $e^{34}$, respectively, upon the dials $e^{37}$ and $e^{38}$, respectively, marked upon the face $e^{39}$ of the calling device. The arrangement of numbering of the dials is shown in Fig. 2 of the drawing. The face plate $e^{39}$ has three curved slots cut in it, through one of which the finger of the index arm $e^{34}$ projects, through the second of which the index finger $e^{28}$ projects, and through the third of which the handle $e^{32}$ of the lever $e^{30}$ is brought out so that the escapement wheel may be rotated to set it. Along the edges of the slots $e^{37}$ and $e^{38}$ characters may be marked to indicate the groups of stationary terminals and movable terminals which will be selected by the associated automatic switch when the movable parts of the calling device are displaced through the degrees indicated by these characters and permitted to return to their normal position. In the present instance, the dial $e^{37}$ bears two series of numbers, from 0 through 49 and from 50 through 99, while the dial $e^{38}$ bears the numbers 0 through 9. In both cases the space between consecutive numbers represents the movement of the associated moving part through a distance corresponding to one tooth of the escapement wheel.

I shall now describe briefly the manner in which the calling device of my invention operates when it is used in connection with an automatic switch such as has been hereinbefore described. The extent of separation between the first contact device and the actuating part on the escapement wheel, and the distance through which the wheel must move before the contact lever $e^{18}$ is engaged and operated, determine the particular group of movable terminals that will be selected and tripped in the operation of the automatic switch; and the extent of displacement of the plate $e^{20}$ bearing the contact lever $e^{19}$, and the distance through which the escapement wheel must move after operating the contact lever $e^{18}$ before it engages and operates the contact lever $e^{19}$, determine the particular group of stationary terminals upon which the selected group of movable terminals of the automatic switch is brought to rest.

Let us assume that the highest group of the series or the tenth level of movable terminals is to be tripped, and that these movable terminals are to be brought to rest upon the thirty-sixth stationary terminals in their corresponding rows. The handle $e^{32}$ of the escapement wheel $e^4$ is grasped, moved slightly inward to withdraw the nose $e^{29}$ of the lever within the line of the protruding contact faces of the levers $e^{18}$ and $e^{19}$, and the escapement wheel is rotated in a clockwise direction—the escapement $e^9$ running idly upon the teeth of the wheel—until the index finger $e^{34}$ points to the character 9 on the dial $e^{38}$. The character 9 stands for the tenth level to conform with the usual practice of the designating the first level by the numeral 0. The escapement wheel is held in the position to which it has been manually moved by the escapement, which is under the control of the electro-magnet. The handle $e^{40}$ of the arm $e^{36}$ is then grasped and moved in a counter-clockwise direction until the index finger $e^{28}$ points to the number 35,—this standing for the thirty-sixth terminal in the row, in conformity with the practice mentioned above. The supporting arm $e^{36}$ is frictionally held in the position to which it has been moved. Thus a definite relation is established between the distance through which the escapement wheel must move from the position at which it has been set until it operates the contact lever $e^{18}$, and the additional distance through which it must be moved before it operates the contact lever $e^{19}$ and the switch springs $e^{27}$ as it comes to rest. As will be explained hereinafter the electro-magnet $e^{11}$ that controls the escapement is energized by current impulses produced in the movement of the automatic switch with which the calling device coöperates. As each current impulse passes through the winding of the magnet $e^{11}$, the escapement $e^9$ is oscillated, and the escapement wheel returns one step toward its position of rest under the impelling force of the helical spring $e^8$. As the nose $e^{29}$ of the lever $e^{30}$ reaches the contact face of the lever $e^{18}$ in the return movement of the escapement wheel, it lifts the lever and causes the breaking of its contact $e^{23}$, the metallic engagement of the nose of the lever $e^{30}$ with the contact lever $e^{18}$, however, closing a circuit, to be described hereinafter, by means of which the intermittent energization of the stepping magnet $e^{11}$ is continued until the nose $e^{29}$ has moved from under the lever $e^{18}$ and permitted it again to close its contact $e^{23}$. The breaking of contact $e^{23}$, with the calling device, set as assumed, occurs at the instant the latch of the upper group of movable terminals of the automatic switch is about to move past the tripping bar, and is instrumental in bringing about the operation of the tripping mechanism at this moment. After the nose of the lever $e^{30}$ has moved past the contact lever $e^{18}$, the impulses of current produced in the operation of the automatic switch are again caused to pass through the stepping magnet $e^{11}$, and at each impulse the magnet causes the escapement wheel to return one step. When the predetermined number of steps have been taken by the automatic switch and by the calling device, the nose of the lever $e^{30}$ of the calling device has been rotated to the point where it moves under the contact face $e^{26}$ of the lever $e^{19}$ and raises the lever so that it breaks its contact $e^{24}$. The breaking of the contact $e^{24}$ is instrumental in bringing about the operation of mechanism that stops the automatic switch at the instant when its selected movable terminals are in engagement with the thirty-sixth stationary terminals in series in their corresponding rows. As before, a circuit is completed in the metallic engagement of the nose of the lever $e^{30}$ with the contact lever $e^{19}$ which continues the intermittent energization of the stepping magnet $e^{11}$ until the nose $e^{29}$ is carried from under the contact face of the lever $e^{19}$, permitting the lever to fall and close its contact $e^{24}$, the stud $e^{33}$ at the same instant coming into engagement with and closing together the contact springs $e^{27}$ which were permitted to separate when the escapement wheel was rotated manually to set it for calling. The parts of the calling device are so related that when the device is set to bring the index finger $e^{28}$ directly opposite any of the index points on the dial, the last impulse of current in the magnet $e^{11}$ causes the nose $e^{29}$ of the lever $e^{30}$ to move up to the tip of the contact face of the lever $e^{19}$, so that the cessation of the last impulse of current causes the nose $e^{29}$ to be carried well clear of the lever $e^{19}$, and the switch springs $e^{27}$ to receive ample movement from the stud $e^{33}$ for their operation.

*Circuits.*—I shall now describe the circuit organization with which the calling device of my invention and the automatic switch which it controls are particularly designed to coöperate, and which in the coöperation of the circuits and instrumentalities is designed to realize a novel telephone system which I am claiming in a co-pending application hereinafter referred to.

Although I have found that the calling device of my invention is particularly well adapted to coöperate with the circuit organization which I shall now describe, and in connection with which I shall set forth the operation of the device in detail, it will be understood that the calling device is capable of employment in other than the particular circuit organization disclosed.

In the accompanying circuit diagram I have illustrated the system with which the calling device of my invention coöperates as comprising two telephone lines extending from their substations to springjacks at a central office and also to stationary terminals of a single connecting switch, with a trunk line extending from the movable terminals of the selecting switch to other springjacks on the switchboard, and a single connecting cord circuit for uniting either of the subscriber's telephone lines with the trunk line terminating in the automatic switch. It is to be understood that a telephone exchange system would ordinarily comprise a large number of each of the elements shown; but for simplicity in illustrating my system and to avoid duplication, I have preferred to show but a few elements.

Generally speaking, the circuit diagram illustrates two metallic circuit telephone lines 1 2 and 5 6 extending from their respective substations A and B to springjacks $a$ and $b$ at a central office, and there adapted for connection by means of a connecting cord circuit C and a trunk line terminating upon an automatic connecting switch S, to terminals of which the telephone lines 1 2 and 5 6 extend. The lines are shown to be provided at their respective substations with the usual common battery substation equipment consisting of a transmitter and one winding of an induction coil in a bridge of the line normally open in the contacts of a switch hook, with the other winding of the induction coil, a telephone receiver and a condenser serially connected in a shunt of the transmitter, the condenser also being included with a telephone bell or ringer in a bridge of the line normally closed with respect to ringing current but open with respect to continuous current. The subscribers' lines 1 2 and 5 6 terminate upon the short and long springs of two springjacks $a$ and $b$ respectively, of the usual three point type. The lines 1 2 and 5 6 are provided with the usual extensions through normally closed contacts of the cutoff relays $v$ and $p$, respectively, and windings of the line relays $v^1$ and $p^1$, respectively, to the central battery D by way of the conductors 9 and 10. The sleeve of the springjack $a$ to which the line 1 2 extends is connected by way of a conductor 3 to the winding of the cutoff relay $v$ controlling the extension of the associated line, and the other end of the winding of the cutoff relay is connected to the free pole of the battery D. In like manner the sleeve or thimble of the springjack $b$ to which the line 5 6 extends is connected by way of conductor 7 to the winding of the associated cutoff relay $p$, the other end of the winding being connected to the free pole of the battery. The armature of the line relay $v^1$ associated with the line 1 2 controls an energizing circuit 4 for the line lamp $a^1$ associated with the springjack $a$, and the armature of the line relay $p^1$ connected with the line 5 6 controls an energizing circuit 8 for the line lamp $b^1$ associated with the springjack $b$. From the conductors 1 2 3 of one of the lines, and from the conductors 5 6 7 of the other of the lines extensions are provided to two separate groups of three stationary terminals each on the automatic connecting switch S. Each line is adapted to be provided with multiple connections to stationary terminals of a number of similar connecting switches, and such multiple connections are indicated by the broken extensions from the conductors of each of the lines.

The connecting cord circuit C by means of which the subscribers' lines are adapted to be connected to the terminal of the trunk line comprises two three-point plugs $c^1$ and $c^2$ adapted to be inserted in the springjacks of the subscribers' lines and of the trunk lines respectively. The tip and ring contact portions of the two plugs of the cord circuit are united by the conductors 13 and 14, respectively, the windings of a repeating coil $c^3$ being interposed in the conductors, and the central battery D being included in a bridge of the windings in the usual manner to supply current for conversation and for the operation of the controlling relays associated with the circuit. The cord circuit is provided with the usual operator's telephone apparatus $c^{10}$, and with a listening key $c^9$ adapted to bring the telephone apparatus into connection with the circuit. The cord circuit is also provided with an answering supervisory relay $c^5$ and a calling supervisory relay $c^4$, included in the portions of the conductor 14 extending from the repeating coil to the answering plug $c^1$ and to the calling plug $c^2$, respectively, these relays controlling the illumination of the answering supervisory lamp $c^8$ and the calling supervisory lamp $c^7$, respectively, by opening or closing about them the shunts containing the resistances $c^{13}$ and $c^{12}$, respectively. The energizing circuit 12 of the answering supervisory lamp $c^8$ includes the lamp in series with the normally open contacts of a relay $c^6$, a resistance $c^{11}$ for limiting the flow of current through the lamp, and the central battery D. The magnet of the relay $c^6$ which controls the energizing circuit 12 of the lamp $c^8$ has a winding of relatively low resistance included serially in a conductor 25 extending from the sleeve contact of the answering plug $c^1$ to the grounded pole of the battery D. The continuity of the conductors 13 and 14 of the connecting cord circuit is normally broken in the contacts $d^1$ and $d^2$ of a relay $d$, the circuit of the talking conductors being completed between the plugs of the connecting cord circuit only when the relay $d$ is energized. The winding $d^4$ of the relay $d$ is included in a conductor 18 extending from the sleeve contact of the plug $c^2$ to another set of contacts $d^3$ of the relay $d$, at which point it is connected when the relay is energized to the conductor 15 extending through the calling supervisory lamp $c^7$ to the grounded pole of the central battery. When the relay $d$ is not energized the conductors 13 and 18 are extended by way of the normal or resting contacts of the switch springs $d^1$ and $d^3$ to conductors 19 and 21, through which operative relation is established between the calling plug $c^2$ and the calling device E with its associated circuits and apparatus. The contacts $d^1$ and $d^3$ of the relay $d$ are of the following or continuity type in order that the circuits of the calling plug may be shifted from the calling device to the cord circuit without breaking their continuity. The conductor 19 to which the tip strand 13 of the calling plug is connected so long as the relay $d$ is not energized, extends to the grounded pole of the battery by way of the normally open contacts $r^1$ of the key $r$, the normally closed contacts $e^{24}$ and $e^{23}$ of the calling device, and the winding $e^{11}$ of the magnet that controls the calling device escapement. While the relay $d$ is normal the conductor 18 of the calling plug $c^2$ including the winding $d^4$ of the relay $d$ is connected by way of the resting contact of the switch spring $d^3$ to the conductor 21 which extends to the grounded pole of the battery by way of a resistance $d^5$, and also has a branch which is connected directly to the grounded pole of the battery when the switch contacts $e^{27}$ are in engagement with each other in the normal condition of the calling device, this branch constituting a short circuit of the resistance $d^5$ when the calling device is in its normal position. In the accompanying circuit diagram the calling device is illustrated as being moved out of its normal position, and with the switch contacts $e^{27}$ consequently out of engagement with each other.

The key $r$ is of the type in which the switch contacts are held in their actuated position mechanically after the key is depressed, and are released by the operation of a trip magnet associated with the key. I have represented the key $r$ as comprising the two sets of switch contacts $r^1$ and $r^2$ with a button by means of which they may be depressed to bring their contacts into engagement, a latch $r^3$ for holding the contacts in engagement after the depression of the key, and a trip magnet $r^4$ adapted when energized to attract its armature $r^5$ and move the latch $r^3$ out of engagement with the switch springs to permit the release of the key. The energizing circuit 23 of the trip magnet $r^4$ extends from the free pole of the central battery $d$ through the winding of the magnet $r^4$, to the normally open contacts $r^2$ of the key $r$, and to the other pole of the battery by way of the normally closed contacts $e^{27}$ of the calling device.

In order that the movement of the calling device may continue after the circuit by way of the conductor 19, over which the energizing current for the magnet $e^{11}$ is obtained, is opened, I connect the lever arm $e^{30}$, which is adapted to engage and operate the contact levers $e^{23}$ and $e^{24}$, by way of conductor 22 with a suitable source of pulsating current for actuating the magnet $e^{11}$,—such as the central battery D together with a commutator $t$ for breaking up the steady flow into pulsations of current.

The trunk line with which the calling device E is associated, and which terminates at its other end upon the automatic connecting switch S, terminates at the end associated with the calling device upon springjacks $f$, $f$, with which lamps $f^2$, $f^3$, respectively, are associated. The plurality of springjacks with which the trunk line is shown to be connected, is to indicate that the trunk line is available for connection at several operators' positions. The trunk line extends in two main conductors 28 and 29 to the tip and ring springs, respectively, of the two springjacks, the remaining or sleeve contact of each of the springjacks being connected to a conductor 27 which extends to the free pole of the central battery D and includes the winding of a relay $f^4$. This relay $f^4$ has a single set of contacts which control a circuit 26 extending from the free pole of the central battery to the two lamps $f^2$ and $f^3$ associated with the springjacks $f$ and $f^1$. These lamps constitute busy signals to indicate by their illumination the appropriation of the trunk for use at any of the multiple springjacks to which it extends. At the other end of the trunk line, the conductors 28 and 29 are connected to two windings of a repeating coil $g$, the other ends of the windings being connected together through a condenser $g^1$. The other two windings of the repeating coil are connected at one end to the poles of the central battery, and at their other end to two conductors 30 and 31 which extend to the inner or alternate contact anvils of the two switch springs $h^1$ and $h^2$, respectively, of the ringing relay $h$. The switch springs $h^1$ and $h^2$ of this relay are connected to conductors 32 and 33 respectively, these conductors extending by way of the normal or resting contacts $i^1$, $i^2$ of the connecting relay $i$ to the two combs of the switch S through the teeth of which connection is made to the two upper movable terminals of each group of three. These are the two terminals of each group which are adapted to engage the stationary terminals of the switch that are connected to the two line conductors of each subscriber's line. The conductor 33 includes the winding of a supervisory relay $n$ in that portion of it which extends between the switch spring $h^2$ of the ringing relay $h$ and the resting contact of the switch spring $i^2$ of the connecting relay $i$.

Connected with the conductor 28 of the trunk line is a conductor 36, which extends to the free pole of the battery D by way of the winding of the line relay $l$. It is the conductor 28 of the trunk line which is connected at the other end of the line with the circuit which includes the contacts $e^{23}$ and $e^{24}$ of the calling device, together with the key $r$ for closing the circuit of the calling device, the winding of the stepping magnet $e^{11}$, and contacts of the relay $d$ for shifting the connecting cord circuit. The line relay $l$, therefore, being in the circuit of this limb of the trunk line, is under the control of the calling instrumentalities at the other end of the line, and through the medium of certain interposed switching mechanism, which will hereinafter be described, it controls the starting, the selective operation, the stopping and the return to its normal position of the connecting switch S. Two branch conductors 38 and 39 lead to contact mechanism of the connecting switch S and it is through the medium of these conductors and their associated switching mechanism that the automatic switch S controls the operation of the calling device E at the other end of the trunk. The reciprocal control of the calling device and the automatic switch over each other, including the starting, stopping, selective operation and return of the automatic switch, is effected over the conductor 28, alone, of the trunk line, the other conductor 29 being left free for the purposes of transmitting the signals incident to the supervision and control of the connection by the operator. These functions exercised by the two conductors of the trunk line are, of course, in addition to their primary function of conducting the voice currents for conversation.

The branch conductor 38 which extends from the conductor 36 passes through a normally closed contact $j^1$ of the controlling relay $j$, a normally open contact $k^1$ of the controlling relay $k$, a normally closed contact $s^{68}$ of the tripping magnet $s^6$ of the automatic switch, and thence to the active interrupter segment $s^8$ from which its circuit is intermittently completed to the grounded pole of the battery in the operation of the automatic switch by the intermittent engagement of the grounded interrupter brush $s^{10}$ with the corrugations of the active segment. The other branch 39 of the conductor 36 which joins the line relay $l$ to conductor 28 of the trunk line, extends directly to the contact rod $s^{47}$ with which the movable terminals $s^2$ come into engagement when they are tripped. The circuit of the conductor 39 may thence be traced through the lower movable terminal lever of any group which has been tripped to the conductor 40, to the conductor 42, and thence by way of the contacts $s^{21}$ and $s^{22}$ of the cam switch, which are in engagement during the period of selecting the movable terminals, to the grounded pole of the battery. It will be seen that the closure of either of the branch conductors 38 and 39 of the conductor 36 including the line relay $l$, establishes a direct return connection to the grounded pole of the battery for current flowing through the line relay $l$, and constitutes a direct short circuit for current which would otherwise flow over the conductor 36 and the trunk line conductor 28 to the calling device at the other end of the trunk.

The control of the calling device, and the associated instrumentalities at that end of the trunk line, over the automatic switch S is effected, as I have before stated, through the medium of the line relay $l$. In order to enable the movement of the armature of the line relay $l$ back and forth between its resting and alternate contacts to govern the somewhat complex movement of the automatic switch, I interpose between the contacts of the line relay $l$ and the electro-magnetic mechanism that controls the movement and selective operation of the automatic switch, certain instrumentalities for shifting the control of the line relay $l$ in succession from one operative circuit of the automatic switch to another to cause the switch to perform its movements to their proper extent and in their proper sequence. In the particular circuit arrangement which I have illustrated, the instrumentalities interposed between the line relay and the automatic switch for shifting the control of the relay over the energizing circuits of the switch, comprise the controlling relays $j$ and $k$, and certain switch contacts associated with the automatic switch S and actuated in its movement. The circuit first closed in the initial energization of the line relay $l$ extends from the grounded pole of the central battery through the switch spring and front or alternate contact of the relay $l$ to the free pole of the battery by way of the conductor 45, the conductor 47, the switch spring $s^{24}$ of the cam switch and the switch spring $s^{23}$ normally in engagement therewith, the conductor 48, the conductor 45, the resting contact of the spring $j^2$ of the relay $j$, the conductor 50, and the magnet $s^{11}$ of the magnetic clutch by means of which power is applied to start the rotation of the carriage of the automatic switch. A short-circuit of a portion of the circuit traced above for the application of current to the power magnet $s^{11}$ is completed by the engagement with its front contact of the switch spring $k^2$ of the controlling relay $k$ when the relay is energized, this short path taking the place of the loop including the conductors 47 and 48 and the switch springs $s^{23}$ and $s^{24}$ of the cam switch. With the switch spring $k^2$ resting on its front contact, and the switch spring $s^{24}$ of the cam switch moved into engagement with the switch spring $s^{25}$, the trip magnet $s^6$ of the automatic switch is connected in a branch of the circuit including the power magnet $s^{11}$, this branch being traceable by way of conductor 47, the switch springs $s^{24}$ and $s^{25}$ of the cam switch, and the conductor 49 through the trip magnet winding to the grounded pole of the battery. This branch circuit containing the trip magnet $s^6$, it will be seen, is short circuited during the energization of the line relay $l$ by the branch extending directly to the grounded pole of the battery by way of the conductor 45 and the front contact of the relay $l$. The foregoing is the circuit of the power magnet $s^{11}$ which may be traced when the switch spring $j^2$ of the relay $j$ is resting on its back contact. When the switch spring $j^2$ is in engagement with its front contact, then the circuit of the power magnet extends from the conductor 50 to the grounded pole of the battery by way of conductor 51 only when the switch spring $k^2$ of the relay $k$ is also drawn against its front contact.

The energizing circuits for the controlling relays $j$ and $k$ are traceable as follows: The relay $k$ is first energized by a circuit which extends from the free pole of the central battery D through the switch springs $s^{19}$ and $s^{20}$ of the cam switch, and by way of the conductor 11 and the resistance coil $k^6$ and conductor 54 including the winding of the relay $k$ to the conductor 58, and thence by way of the normally closed contacts $s^{28}$ of the automatic switch S to the grounded pole of the battery. Immediately upon the initial energization of the relay $k$, the contacts $k^4$ of the relay are closed, and the continued energization of the relay is thus insured by the direct path established to the grounded pole of the battery, independent of the condition of the path by way of the conductor 58. During a subsequent stage of the operation, a path for the energization of the relay $k$ exists by way of the switch springs $s^{19}$ and $s^{20}$ of the cam switch, the conductor 11, the resistance coil $k^6$, the conductor 54 including the winding of the relay $k$, to the front contact of the switch spring $j^5$ of the relay $j$ and thence by way of conductor 52 and the switch springs $s^{26}$ and $s^{27}$ of the cam switch to the grounded pole of the battery through the back contact and switch spring of the line relay $l$. A branch circuit for effecting the deënergization of the relay $k$ extends from a point on the conductor 54 between the resistance coil $k^6$ and the winding of the relay $k$, by way of the conductor 53, to the resting contact of switch spring $j^5$ of the relay $j$, and thence by way of the path already traced through the conductor 52 and the switch springs $s^{26}$ and $s^{27}$ of the cam switch to the grounded pole of the battery by way of the resting contacts of the line relay $l$. It will be observed that the closure of the path to the grounded pole of the battery by way of the resting contacts of the relay $l$ will, in one position of the switch spring $j^5$ of the relay $j$, deënergize the relay $k$ by short circuiting it, and in the alternate position of the switch spring $j^5$ will energize the relay $k$. Relay $j$ is energized by means of a circuit that extends from the free pole of the central battery D by way of the switch springs $s^{17}$ and $s^{18}$ of the cam switch to the conductor 56 including the winding of the relay $j$, and thence by way of the resting contact of the switch spring $k^2$ of the relay $k$ to the grounded pole of the battery by way of the conductor 45 and the front contact of the line relay $l$. The initial energization of the relay $j$ causes the closure of its contact $j^3$, through which a circuit is completed directly to the grounded pole of the battery, so that the energization of the relay $j$ is maintained thereafter independent of the condition of the path to the grounded pole of the battery by way of the conductor 56, the switch contacts $k^2$ of the relay $k$, and the contacts of the line relay $l$.

I employ in my trunk circuit as illustrated a test relay $m$, which is adapted to be responsive to the electrical condition which marks whether a selected line is busy or idle, and is adapted to permit or prevent the extension of the trunk circuit to the selected line depending upon its condition. The circuit of this relay extends from the grounded pole of the central battery by way of the resistance coil $m^3$, and the winding of the relay $m$ to the conductor 40, which is connected to the comb, the teeth $s^{45}$ of which are in multiple engagement with the third of the three movable terminals $s^2$ of each group. The relay $m$ is adapted to operate its switch springs when the current flow through its winding has a certain value, but not to operate them when the current flow through its winding has a value considerably less than the operating value. There is a short circuit about the resistance coil $m^3$ controlled in contacts $i^3$ of the connecting relay $i$. This short circuiting path is held open when the circuit of the testing relay $m$ is applied to the terminal of a selected line which is busy, but is closed to short circuit the resistance $m^3$ if the selected line is idle and connection is established with it.

The connecting relay $i$ is under the joint control of the testing relay $m$, and of the energizing circuit of the power magnet $s^{11}$. One of the two windings of the relay $i$ is included in a circuit which extends from the free pole of the central battery D by way of the switch springs $s^{19}$ and $s^{20}$ of the cam switch and the conductor 11 to the conductor 24 including the winding of the connecting relay $i$, and thence to the grounded pole of the battery by way of the normally closed contacts $m^1$ of the testing relay $m$. The other winding of the connecting relay $i$ is included in a conductor 59 which extends from the free pole of the central battery to the conductor 50 in which the power magnet $s^{11}$ is included, so that this winding of the relay $i$ and the winding of the power magnet $s^{11}$ are included in parallel branches of the same energizing circuit, and both are energized or deënergized at the same time. The two windings of the connecting relay $i$ are disposed upon the core so as to have a cumulative magnetic effect,—that is, such that the magnetism produced by one reinforces the magnetism produced by the other.

The testing relay $m$ controls in its contacts $m^2$ a circuit for throwing back upon the trunk a busy tone current in case the selected line is found to be busy. This circuit extends from the grounded pole of the battery through the interrupter $w$ and one winding of the usual busy tone transformer $w^1$ to the conductor 43, and thence through the normally open contacts $j^4$ of the relay $j$ and the normally closed contacts $k^5$ of the relay $k$ to the resting contact of the switch spring $m^2$ of the testing relay $m$, from which point it extends by way of the conductor 37 to the conductor 29 of the trunk line. When the switch spring $m^2$ of the testing relay $m$ is in engagement with its front contact, as it is during the continuance of a connection, the conductor 29 of the trunk line has a branch to the grounded pole of the battery by way of the conductors 37 and 44, which is controlled in the contacts $n^1$ of the supervisory relay $n$. During the continuance of the connection therefore, the flow of current from the associated cord circuit at the other end of the trunk is controlled by the supervisory relay $n$. The conductor 44 also includes one of two windings of the ringing relay $h$, so that the actuation of the ringing relay is also under the control of the supervisory relay $n$.

The ringing relay $h$ is provided with two switch springs $h^1$ and $h^2$ which are adapted when attracted into engagement with their inner contacts, as has been hereinbefore stated, to connect the conductors 32 and 33, which extend to two of the movable terminals of the automatic switch, with the trunk conductors 30 and 31 to complete the talking circuit of the trunk. When the switch springs $h^1$ and $h^2$ lie in their normal position against their resting contacts, the conductors 32 and 33 of the trunk are extended by way of the conductors 34 and 35 to a generator of ringing current $z$. The second winding of the ringing relay $h$ is connected in a circuit which extends from the free pole of the central battery D by way of the switch springs $s^{19}$ and $s^{20}$ of the cam switch and the conductors 11 and 46 to the normally open contacts $h^3$ of the relay $h$, and thence through the second winding of the relay $h$ to the conductor 45 and to the grounded pole of the battery by way of the front contacts of the line relay $l$. This circuit serves as a locking circuit to maintain, under the control of the line relay $l$, the energization of the ringing relay $h$ after it has been initially actuated by the flow of current in its other winding. The two branches of the conductor 36 by means of which the automatic switch S exerts control over the operation of the calling device E at the other end of the trunk, I have spoken of heretofore. One is the conductor 38 which extends through the normally closed contacts $j^1$ of the controlling relay $j$, the normally open contacts $k^1$ of the controlling relay $k$ and the normally closed contacts $s^{68}$ of the tripping magnet to the interrupter segment $s^8$, and thence intermittently to the grounded pole of the battery by way of the interrupter brush $s^{10}$, and the other is the conductor 39 which extends to the contact rod $s^{47}$ of the automatic switch, and thence to the grounded pole of the battery by way of the third contact lever of any group that happens to have been tripped to bring its levers into engagement with the contact rod, the circuit to the grounded pole of the battery being by way of the conductor 42 and the switch spring $s^{21}$ and $s^{22}$ of the cam switch.

*Mode of operation.*—I shall now describe the manner in which the circuits and devices of my invention are employed in establishing connection between two subscribers in a telephone exchange.

Let us assume that the subscriber at station A wishes to talk to the subscriber at station B. The subscriber at A lifts his telephone receiver from its hook, thus completing a bridge of the circuit which permits current to traverse the windings of the line relay $v^1$ associated with this line, and causes the relay to attract its armature to close the circuit and effect the illumination of the line lamp $a^1$ associated with his line. Upon observing the illumination of the lamp the operator inserts the answering plug $c^1$ of a pair of connecting cords into the associated line jack $u$, and in doing so extends the circuit of the calling subscriber's line to the connecting cord circuit, and at the same time completes a circuit by way of the sleeve contact of the jack and the registering contact of the plug which energizes the cut off relay $v$ and extinguishes the line lamp. This same circuit also energizes the relay $c^6$ associated with the cord circuit, and causes it to close its contact to complete the energizing circuit of the answering supervisory lamp $c^3$, the illumination of this lamp being prevented, however, by the closure of its shunting circuit in the contacts of the answering supervisory relay $c^5$. The operator communicates with the calling subscriber by operating her listening key $c^9$, and learns that he wishes to be connected with the line extending to substation B. We will assume that the called line extending to station B terminates upon the three terminals which are thirty-sixth in order in the top three rows of stationary terminals on the automatic switch S and on the other like connecting switches to which it extends. The number by which the called subscriber's line is designated, and which number is used in the request for connection with that line, may be such that the operator is informed of the combination to set on the dials of the calling device without any necessity for reasoning or calculation on her part. In the present case, for instance, the number of the line with which the calling subscriber requests connection may be 935. The operator upon receiving from the calling subscriber the number of the line wanted, first sets the calling device to correspond with the number requested. In the present instance, she grasps the handle of the calling device and rotates it from right to left until the pointer or index finger $e^{34}$ points to the number 9 on the dial. She then swings the handle $e^{40}$ of the calling device in a counter-clockwise direction until the index finger $e^{28}$ rests exactly at the figure 35 on the dial $e^{37}$. After setting on the calling device the combination of the line with which connection is to be obtained, she inserts the calling plug $c^2$ into the jack of a non-busy trunk line extending to an automatic switch serving the group of subscribers' lines in which the called line is included, and finally depresses the key $r$, which latches in its depressed position. The first act of the operator in setting the combination of the called line on the calling device E withdraws the insulated stud $e^{33}$ from the switch springs $e^{27}$, permitting them to separate, and thus withdrawing the short circuit from the resistance $d^5$, and opening the path by way of which current would otherwise flow through the release magnet $r^4$ of the key $r$ when it is depressed. The relay $d$ of the connecting cord circuit is so adjusted that it does not attract its armature and operate its switch springs upon the current which flows through it while the resistance $d^5$ is included in its circuit, but is operated so soon as resistance $d^5$ is short circuited by the closure of the contacts $e^{27}$ upon the return to its normal position of the calling device. Consequently, while current flows through the circuit including the winding of the relay $d$, as soon as the plug is inserted in the trunk jack $f$, for the energization of the relay $f^1$ of the trunk line and the illumination of the lamps $f^2$, $f^3$ to indicate that the trunk line is engaged, sufficient current for the actuation of the relay $d$ of the cord circuit does not flow until the calling device has returned to its normal position and operated the switch springs $e^{27}$. Likewise, current does not flow for the energization of the release magnet $r^4$ of the key $r$, and the consequent restoration of the key to its normal position, until the switch springs $e^{27}$ have been operated at the end of the return movement of the calling device. The instant the key $r$ is depressed after the calling device has been set and the plug $c^2$ inserted in the trunk jack $f$, the line relay $l$ at the other end of the trunk is energized over a circuit which extends from the free pole of battery D, by way of the conductor 36 including the winding of the line relay $l$, the conductor 28 of the trunk line, the tip spring of the trunk jack $f$ and the engaging tip contact of the calling plug $c^2$, and the conductor 13 of the cord circuit, the switch spring $d^1$ of the relay $d$ and its resting contact, the conductor 19 and the contacts $r^1$ of the calling key $r$ to the calling device E, where it extends to the grounded pole of the battery through the two contacts $e^{24}$ and $e^{23}$, and the winding of the stepping magnet $e^{11}$ in series. The result, therefore, of depressing the calling key $r$ associated with the calling device, is to cause the line relay $l$ to draw its switch spring into engagement with its front contact, and to cause the stepping magnet $e^{11}$ of the calling device to attract its armature, and thus permit a half oscillation of the escapement, and the return of the escapement wheel through the space of one half a tooth. The calling device therefore remains stationary until a further change takes place in the current flowing through its magnet, and this change is brought about by the operation of the automatic switch at the other end of the trunk. When the line relay, upon the completion of its energizing circuit by the closure of the calling key $r$, moves its switch spring into engagement with its front contact, it closes a circuit for the energization of the power magnet $s^{11}$, this circuit extending by way of the conductors 45, 47, 48, and 50, the switch springs $s^{23}$ and $s^{24}$ of the cam switch, and the resting contact of the switch springs $j^2$ of the controlling relay $j$. Upon the closure of this circuit the magnetic attractive force developed in the power magnet $s^{11}$ draws the clutch disk $s^{12}$ into engagement with the head $s^{13}$ of the magnet, and starts the advance movement of the carriage of the switch. As the carriage starts to rotate, the cam $s^{15}$ moves the roller $s^{16}$ to actuate the associated springs of the cam switch. The first set of switch springs to be operated at the outset of the movement of the carriage is the set consisting of the springs $s^{19}$ and $s^{20}$, which are forced into contact and immediately permit current to flow out over the conductor 11 and through the resistance $k^6$ of the winding of the controlling relay $k$, the circuit being completed to the grounded pole of the battery by way of the conductors 54 and 58 and the switch springs $s^{28}$ associated with the automatic switch. These switch springs $s^{28}$ are permitted to open an instant later in the continued movement of the switch carriage, but before they open the controlling relay $k$ has completed a locking circuit for its continued energization by way of its switch contacts $k^4$. An instant later in the movement of the carriage and operation of the cam switch, the switch springs $s^{17}$ and $s^{18}$ are forced into engagement, the closing of these contacts being delayed to occur a little after the closing of the contacts $s^{19}$ and $s^{20}$, to insure the operation of the controlling relay $k$, and the opening of the energizing circuit which would otherwise be formed by way of the conductor 56 for the relay $j$, before current is applied to this relay by way of the switch springs $s^{17}$ and $s^{18}$. By the operation of the controlling relay $k$ and of the switch springs $s^{23}$, $s^{24}$ and $s^{25}$ of the cam switch, the energizing circuit of the power magnet is completed directly by way of the switch spring $k^2$ of the controlling magnet $k$ and its front contact, instead of by way of the cam switch, and the trip magnet $s^6$ is connected in a branch of the energizing circuit of the power magnet by way of the conductor 47 and 49 and the switch springs $s^{24}$ and $s^{25}$ of the cam switch. The circuit thus established includes the power magnet $s^{11}$ in the undivided portion of a divided circuit, with the trip magnet $s^6$ in one branch of the circuit and the line relay $l$ controlling in its front contact the other branch of the divided circuit, which branch constitutes a direct short circuit of the trip magnet. It will be seen that so long as this circuit condition exists, the falling back of the line relay $l$ to open its front contact removes the short circuit from and effects the instant actuation of the trip magnet $s^6$, but that the power magnet still continues energized on account of the current which continues to flow through the branch of its circuit containing the trip magnet.

To effect the deënergization of the line relay $l$, and the consequent operation of the trip magnet $s^6$ to trip and render active a particular group of movable terminals, it is necessary for the calling device to be stepped around far enough in its return movement to engage and operate the first contact lever $e^{23}$, and thus open the circuit of the line relay. After the movement of the automatic switch S has been started, as has been described, by the operation of the line relay $l$ and the closure of the energizing circuit of the power magnet, the movement of the switch carriage causes the interrupter brush $s^{10}$ to ride on to the first corrugation of the active segment $s^8$ of the interrupter, and in doing so to complete a branch circuit extending directly to the grounded pole of the central battery from the circuit uniting the line relay $l$ and the calling device at the other end of the trunk line, this branch circuit extending by way of the conductor 38 and switch contacts of the controlling relays $j$ and $k$ and switch contacts of the tripping magnet $s^6$. The effect of the closure of this direct path to the return pole of the battery is to divert from the magnet $e^{11}$ of the calling device all of the current which has been flowing through it, and the consequent deënergization of the magnet permits its armature to fall back, the escapement to make a half oscillation, and the escapement wheel to return another half step toward its normal position,—the first half step having been taken when the key $r$ was depressed—thus completing the first step of the return movement. It will be observed that the circuit arrangement is such that this control of the movement of the calling device by the contact parts of the automatic switch S is effected without affecting the operation of the line relay $l$ by means of which the calling device controls the operation of the automatic switch, the contact device of the automatic switch interrupting the flow of current through the magnet of the calling device without interrupting the flow of current which maintains the energization of the line relay $l$.

As long as the line relay $l$ remains energized, the power magnet $e^{11}$ receives current and the movement of the carriage of the switch S continues; and as long as the switch carriage continues to move the interrupter brush $s^{10}$ continues intermittently to complete a direct path from the line relay and calling device circuit to the grounded pole of the battery by its intermittent engagement with the active interrupter segment $s^8$. As the interrupter brush $s^{10}$ in the movement of the switch rides off of the first corrugation of the active segment $s^8$ it opens the short circuit of the calling device magnet and the consequent energization of that magnet causes the escapement wheel of the calling device to take another half step, which step is completed when the stepping magnet $e^{11}$ is deënergized upon the interrupter brush $s^{10}$ riding on to the next corrugation of the active segment. Thus the calling device, by maintaining the energization of the line relay $l$ causes the movement of the connector switch S, and the connector switch in its movement controls the movement of the calling device, both devices moving together through corresponding degrees of their movement. In the steady advance of the automatic switch S, and the corresponding steady return toward its normal position of the calling device E, the escapement wheel of the calling device reaches a point where, at the moment the interrupter brush $s^{10}$ moves on to a corrugation of the active interrupter segment and completes a short circuit of the calling device, and at the moment the line of latches $s^3$ is about to be moved past the highest or last tooth $s^5$ on the trip bar $s^4$, the nose of the lever $e^{10}$ carried by the escapement wheel moves under and raises the contact lever $e^{18}$, thus causing it to break its contacts $e^{23}$. An instant later, and before the line of latches has quite reached the last or tenth tooth of the trip bar, the interrupter brush $s^{10}$ moves off of the corrugation of the active segment, and thus interrupts the circuit to ground through the branch conductor 38. As the other branch of the circuit of the line relay by way of the contacts of the calling device has been interrupted an instant before, current ceases to flow through the line relay, and in the consequent deënergization of the relay $l$ the branch of the power magnet circuit by way of the conductor 45 and the front contact of the line relay is opened. But this branch of the power magnet circuit, it will be remembered, during this stage of the operation merely constitutes a short circuit of the branch containing the tripping magnet, so that the opening of the branch by way of the front contact of the line relay $l$ merely serves to divert into the tripping magnet branch the current that has been flowing through the power magnet by way of the branch controlled by the line relay.

The tripping magnet is thus instantly energized upon the interruption of current flow in the line relay circuit, while at the same time the flow of current through the power magnet $s^{11}$ is unaffected, and the movement of the switch carriage continues without interruption. The instant the tripping magnet $s^6$ receives current and starts to draw up its armature, it interrupts in its normally closed contacts $s^{68}$ the branch 38 by means of which the interrupter brush $s^{10}$ controls the flow of current to the circuit of the trunk line including the line relay $l$ and the calling device. This is in order to insure the full operation of the tripping device by preventing the circuit of the line relay from being closed by the engagement of the interrupter brush with the next corrugation of the active segment before the tripping magnet has had an opportunity to thrust the tripping bar into engagement with the latch. If the line relay should be reënergized too soon, it would reëstablish the short circuit of the tripping magnet before the magnet had had time to attract its armature far enough to trip the latch that was being moved past at the moment. At the moment, therefore, that, according to our present assumption as to the number of the line called, the last or tenth latch is being moved past the last tooth on the trip bar, the bar is moved to bring the tooth into the path of movement of the latch, and the latch is tripped, thus releasing the three movable terminal levers associated with it, and permitting them to fall into engagement with the contact rod $s^{47}$. The conductors 32 and 33 extending from the upper two of the three tripped movable terminals are open in the contacts of the connecting relay $i$, this relay being energized at the time by current flowing through both of its windings. The third movable terminal $s^2$ of the three that have been tripped is connected during this stage of the operation directly to the grounded pole of the battery by way of the conductor 42 and the closed contacts $s^{21}$ and $s^{22}$ of the cam switch. Consequently the instant the tripped levers fall against the contact rod $s^{47}$, the branch circuit 39 is completed directly to the ground from the circuit of the trunk line including the line relay and the calling device, and the line relay is energized through this branch—the branch through the calling device being at the moment open in the contacts $e^{23}$—to attract its switch spring into engagement with its front contact, and reëstablish the short circuit of the tripping magnet $s^6$. In this way the tripping magnet $s^6$ in successfully performing its office automatically renders itself inactive hereafter.

While the actions described above have been taking place at the end of the trunk line associated with the automatic switch, the circuit of the trunk line extending from the line relay $l$ by way of the conductors 36, 28, 13 and 19 has been open in the contact $e^{23}$ of the lever $e^{18}$ of the calling device, this interruption of the circuit persisting until the movement of the escapement wheel has carried the nose of the lever $e^{30}$ from beneath the contact face of the lever $e^{18}$. During the interval while the stepping magnet $e^{11}$ of the calling device is cut off by the interruption at contact $e^{23}$ from the actuating current flowing over the trunk line, it receives pulsations of current from the battery and commutator $t$ by way of the circuit which is completed through conductor 22 and the engagement of the lever $e^{30}$ on the escapement wheel with the contact face of the lever $e^{18}$. In the present instance, the calling device is arranged to hold the contacts $e^{23}$ open during two steps of its movement, and to supply pulsating current from the local source to effect this portion of its movement. The arrangement is such that the circuit is held open in the calling device long enough to permit the train of actions which have been described to take place at the other end of the trunk before the circuit is again closed, and to bring about the closure of the circuit at the calling device before the automatic switch at the other end of the trunk line has reached the point in its movement where it commences the transmission of the second series of impulses to the calling device.

After the predetermined group of movable terminals has been selected and tripped, as described in the foregoing, the rotation of the switch carriage continues uninterruptedly; but the closure of the path direct to ground by way of the conductor 39, the contact rod $s^{47}$ and the engaging movable terminal, renders the intermittent short circuit applied by way of the interrupter brush $s^{10}$ and the active segment $s^8$ ineffective to produce any pulsations of current in the branch of the line relay circuit extending to the calling device,—that is, assuming that the tripping occurred at a point beyond which there were other corrugations of the active segment to be traversed by the interrupter brush during this stage of the operation. After leaving the last corrugation of the active segment associated with the tripping stage of the switch, the interrupter brush $s^{10}$ rides on to the long tooth of the active segment, and while it is moving over this tooth, direct paths to the grounded pole of the battery from the line relay circuit exist by way of both branch 38 and branch 39. While the brush is moving over the long tooth of the active segment, the cam $s^{15}$ at the bottom of the switch carriage is advanced to a point where the roller of the cam switch rides off of the elevated portion of the cam and on to the intermediate portion. As a result of this change the cam switch contact $s^{21}$ separates from the contact $s^{22}$, thus removing the ground connection from the conductor 40 extending to the third of the three movable terminals, the contact $s^{24}$ separates from the contact $s^{25}$, and thereby disconnects the trip magnet $s^6$ from the circuit, but does not move into engagement with the contact $s^{23}$; and the contact $s^{27}$ moves into engagement with the contact $s^{26}$, thereby closing the circuit of the conductor 52 in readiness to effect the deënergization of the controlling magnet $k$ when the line relay $l$ next closes its back contact. The spring $s^{17}$ still remains in engagement with the spring $s^{18}$, and the spring $s^{19}$ with the spring $s^{20}$, to continue the supply of current in the different portions of the circuit. As the switch carriage advances, and while the interrupter brush $s^{10}$ is still in engagement with the long tooth of the active segment, the three movable terminals $s^2$ ride up on the surface of the insulating block or cylinder $s^{33}$ upon which the stationary terminals $s^1$ are mounted, thus interrupting their engagement with the contact rod $s^{47}$. An instant later the interrupter brush $s^{10}$ moves off of the long tooth of the active segment, and in doing so interrupts the direct path from the line relay circuit to ground by way of the conductor 38. As the other path to ground by way of the conductor 39 was interrupted a moment before by the operation of the cam switch and the breaking of the engagement of the movable terminals with the contact rod $s^{47}$, this leaves current free to flow over the circuit of the line relay to the magnet $e^{11}$ of the calling device at the other end of the trunk. Pending the resumption of the transmission of impulses of the current from the other end of the trunk the escapement wheel of the calling device has been at rest, the local source of pulsations having moved the escapement wheel far enough to move the nose of the lever $e^{30}$ from beneath the contact lever $e^{18}$. The interruption of the short circuit of the calling device, therefore, as the interrupter brush moves off of the long tooth, causes the escapement wheel to take half a step, the step being completed when the interrupter brush moves on to the next corrugation of the active segment. As the brush moves on to and off of each succeeding corrugation in the continuous movement of the switch carriage, the escapement wheel of the calling device takes one step for each consequent closure and interruption of the short circuit of its magnet $e^{11}$, and the calling device therefore keeps pace in its movement with the movement of the automatic switch. As the switch carriage rotates, the three movable terminals $s^2$ of the group that has been tripped trail over the stationary terminals in their corresponding rows; but no disturbing circuit is completed by this momentary engagement, inasmuch as the two movable terminals connected to conductors 32 and 33 are held open in the contacts of the relay $i$, which is energized as long as the switch is moving on account of one of its windings being connected in multiple with the power magnet. The passage of the movable terminal connected with the conductor 40 over certain of the stationary terminals may cause the actuation of the associated testing relay $m$; but the circuits associated with this relay are not at this time in condition to be affected by its movements. Under our assumption that the stationary terminals of the line with which connection is to be completed are the thirty-sixth in order in the three rows over which the tripped movable terminals travel, as the carriage of the automatic switch S approaches the thirty-sixth terminals of the rows, the nose of the lever $e^{30}$ of the engagement wheel approaches the projecting contact face of the lever $e^{24}$ of the calling device. As the interrupter brush $s^{10}$ rides on to the corrugation of the active segment $s^8$ which corresponds to the thirty-sixth stationary terminals of the rows, it deprives the stepping magnet $e^{11}$ of current, and permits the escapement wheel of the calling device to complete the step which carries the nose of the lever $e^{30}$ into engagement with the contact lever $e^{19}$ and lifts it to break its contacts $e^{24}$. Engagement between the nose of the lever $e^{30}$ and the face of the contact lever $e^{19}$ completes the circuit by means of which impulses of current are supplied from the local source $t$ for the continued operation of the escapement wheel during the interruption of the trunk circuit in the contacts of the lever $e^{19}$. After the branch of the line relay circuit which extends by way of the calling device has been interrupted in the contact $e^{24}$ of the lever $e^{19}$, current still continues to flow through the line relay $l$ by way of the branch 38 which extends to the grounded pole of the battery by way of the interrupter brush $s^{10}$ and the active segment of the interrupter. Current continues to flow by way of this branch until the interrupter brush has ridden off of the corrugation of the active segment $s^8$ the engagement with which caused the calling device to take the last half step that resulted in the interruption of the other branch of the line relay circuit in the contacts $e^{24}$. Consequently, when the path by way of the interrupter brush and the active segment is broken, the circuit of the line relay is left open in both of its branches, and the relay immediately acts to open its front contact and close its normal or resting contact. This happens at the instant when the movable terminals of the group that has been tripped come into engagement with the thirty-sixth in series, according to our present assumption, of the stationary terminals in their corresponding rows.

It will be remembered that in the operation of the cam switch while the switch carriage is traversing the long tooth of the interrupter, the connection of the trip magnet with the circuit of the power magnet was broken, so that thereafter the continuation of the flow of current through the power magnet to effect the rotation of the carriage has been dependent entirely upon the continued closure of the branch of the power magnet circuit that extends to the grounded pole of the central battery by way of the front contact of the line relay $l$. Therefore, the instant the line relay is operated to open its front contact the current ceases to flow in the energizing circuit of the power magnet, and the magnet releases its hold upon the clutch disk $s^{12}$ through the medium of which the rotation of the switch carriage is being effected. The carriage thereupon comes to rest with the selected, or tenth, group of movable terminals in engagement with the thirty-sixth stationary terminals in order in the corresponding rows. As current ceases to flow in the winding of the power magnet $s^{11}$, it also ceases to flow in the winding of the connecting relay $i$ that is connected in parallel with the power magnet winding in the power circuit. If, now, no current is circulating in the second winding of the connecting relay, that relay will be deënergized and will permit its switch springs $i^1$, $i^2$ and $i^3$ to close upon their normal contacts, thus extending the circuit of the conductors 32 and 33 connected with the first two movable terminals of the group to the ringing generator $z$ by way of the resting contacts $h^1$ and $h^2$ of the ringing relay $h$, which at this time is not energized. Whether or not current is flowing at this juncture in the second winding of the connecting relay $i$ depends upon whether or not the testing relay $m$ is receiving sufficient current for its energization. This, in turn, depends upon the busy or idle condition of the line with which the automatic switch has brought its selected movable terminals into connection. If the line is busy, it will be either because a plug is inserted in the answering spring jack $b$ associated with the called line, or because some other automatic switch has completed connection with the line at other stationary switch terminals to which the line is multipled. The presence of the plug in the answering jack $b$ of the called line provides a path of low resistance, by way of the winding of the relay $c^3$ of the cord circuit, for current to flow to the grounded pole of the battery through the circuit which extends from the free pole of the battery by way of the winding of the cut off relay $p$ and the conductor 7 to the sleeve of the answering jack $b$, and also to the third stationary terminal of each group to which the line is connected. Consequently, when the circuit through the testing relay and the relatively high resistance of the coil $m^3$ included in series with the relay winding is brought into parallel relation with the low resistance branch extending to earth by way of the relay $c^0$ of the connecting cord circuit, so much of the total current flow is diverted from the branch containing the testing relay $m$ that the relay does not receive enough current for its actuation. The switch springs of the testing relay, therefore, remain in engagement with their normal or resting contacts, and although current has ceased to flow in one winding of the connecting relay $i$ on account of the opening of the power magnet circuit, it continues to flow in the other winding by way of the conductor 24 and the closed contact of the testing relay. Hence, if the selecting line is found to be busy by reason of the presence of a plug in the answering jack, the connecting relay $i$ is not released, and the circuit of the trunk line remains open in the contacts of this relay, thus preventing interference with the connection that has already been established with the line by way of its answering jack.

In case the selected line is busy by reason of having been connected with at the stationary terminals of some other automatic switch to which it may extend, the testing relay $m$ of the automatic switch which we are assuming is trying to make connection with the line is prevented from being actuated in the same manner that it is prevented where the line is made busy by a connection at its answering jack, as described above; that is, so much of the current flowing in the third conductor 7 of the selected line by way of the winding of the cut off relay $p$ is diverted from the testing relay $m$ of the automatic switch whose operation we are now considering, that the testing relay is not operated, and consequently the energizing circuit of the second winding of the connecting relay remains closed. If the selected line is idle, the instant the movable terminals of the automatic switch engage and come to rest upon the stationary terminals of the selected line, the entire current flow which the winding of the cut off relay $p$ permits in the third conductor of the line, passes through the circuit including the winding of the testing relay $m$ and the resistance coil $m^3$. This flow of current is sufficient to energize the testing relay, and the relay thereupon attracts its switch springs from their normal or resting contacts, and in doing so interrupts in its contacts $m^1$ the flow of current through the second winding of the connecting relay $i$. As the flow of current in the first winding of the connecting relay ceased the instant current ceased to flow in the power magnet circuit, the connecting relay is now rendered inert, and permits the retraction of its switch springs to extend the main conductors of the automatic switch to the ringing generator $z$, and to close, by way of its contacts $i^3$ and conductor 41, a short circuit of the resistance coil $m^3$ in the circuit of the testing relay. Thus the operation of the testing relay upon coming into connection with an idle selected line, permits the application of ringing current to that line, and also reduces the resistance of the branch of the circuit containing the testing relay $m$ by short-circuiting the resistance coil $m^3$, so that when the testing branch of a subsequently calling trunk is brought into parallel with it, the second testing relay does not receive current enough for its actuation, and consequently prevents the associated switch from completing the connection.

In the immediately preceding portion of the specification I have described the operation which follows the interruption of the circuit by way of the front contact of the line relay $l$, the consequent deënergization of the power magnet $s^{11}$ and the stopping of the switch. Another result consequent upon the deënergization of the line relay $l$ by reason of the opening of its energizing circuit at the calling device E and at the interrupter brush $s^{10}$, is that a circuit is completed by way of the back or normal contact of the line relay which results in short circuiting the winding of the controlling relay $k$, this circuit being traceable from a point between the resistance coil $k^6$ and the winding of the controlling relay $k$, by way of conductor 53 contacts $j^3$ of the relay $j$, conductor 52 and the contacts $s^{26}$ and $s^{27}$ of the cam switch to earth by way of the back contacts of the line relay $l$. It will be remembered that the contact springs $s^{26}$ and $s^{27}$ of the cam switch were held out of engagement with each other during the first or "level" selecting stage of movement of the automatic switch, and were brought into contact at the commencement of the second line selecting stage of movement of the switch. Consequently, the deënergization of the line relay $l$ during the second stage of movement of the automatic switch is made effective to short circuit and render inert the controlling relay $k$. The retraction of the switch springs of the controlling relay $k$ opens the branch 38 of the line relay circuit at switch contacts $k^1$, shifts, in its switch contacts $k^3$, the control of the front contact of the line relay from the power magnet $s^{11}$ to the energizing winding of the controlling relay $j$, breaks the locking circuit of the controlling relay $k$ in the contacts $k^4$, and closes one of the interruptions in the conductor 43 of the busy test circuit at the switch contacts $k^5$. The above described condition, wherein the selected set of movable terminals is at rest in engagement with the selected set of stationary terminals, and both controlling relays $j$ and $k$ are deënergized, exists until the line relay $l$ is again energized to attract its armature and close its front contact. This energization of the line relay $l$ is effected by the subsequent operation of the calling device E which I shall now describe.

It will be remembered that the last half step of the calling device which opened the contacts $e^{24}$ and thus interrupted the circuit of the line relay $l$, also completed the local stepping circuit for the actuating magnet $e^{11}$ of the calling device. Consequently, while the above described changes of the switching mechanism are taking place at the other end of the trunk line, the stepping magnet of the calling device causes the escapement wheel $e^4$ to continue its return movement until, at the instant immediately preceding the last half step which brings the escapement wheel into its home position, the end of the lever $e^{30}$ rests upon the tip of the nose of the contact lever. Upon the cessation of the pulsation of current in the local stepping circuit that has advanced the escapement wheel to this position the stepping magnet $e^{11}$ is deënergized, the last half step is taken, the contact lever $e^{19}$ falls upon its anvil, closing contacts $e^{24}$, and the insulating lug $e^{33}$ carried by the escapement wheel is brought against the switch $e^{27}$ and cause its several members to move into engagement with each other. The operation of the switch $e^{27}$ completes the energizing circuit 23 of the releasing magnet $r^4$ associated with the manually operated key $r$, and also closes a short circuit of the resistance coil $d^5$ included in the circuit of the relay $d^4$. It will be remembered that the presence of the resistance coil $d^5$ in the circuit of the relay $d^4$ has heretofore prevented sufficient current for the energization of that relay from flowing through the circuit, although enough has passed for the energization of the relay $f^4$ that controls the illumination of the trunk busy signal lamps $f^2$ and $f^3$. The increase in current flow consequent upon the completion of the short circuit about the resistance coil $d^5$ by the return of the calling device to its normal or home position causes the relay $d^4$ to attract its switch springs against their alternate or front contacts. In the movement of the switch springs $d^3$, the energizing circuit of the relay $d^4$ is interrupted by way of the branch extending through the switch $e^{27}$ of the calling device, but is completed by way of the branch extending through the conductor 15 and the calling supervisory lamp $c^7$ of the connecting cord circuit. The switch spring $d^3$ of the relay $d$ is arranged to close one of its contacts before it interrupts the other, in order that the attraction of the switch spring may cause no interruption in the flow of energizing current through the relay. The other switch springs $d^1$ and $d^2$ operate in the energization of the relay $d$ to complete the connecting cord circuit in their front or alternate contacts, the switch spring $d^1$ at the same time interrupting the connection of the conductor 13 with the tip of the connecting plug, and thus disconnecting the calling device from the cord circuit. The switch spring $d^1$ of the relay $d$ is so related to its alternate contact and the sequence of operation of the devices is such that the circuit of the conductor 13 extending to the tip of the connecting plug is closed in the front contact of the relay before the circuit by way of the back contact is interrupted. As a result of the changes described above consequent upon the return of the calling device E to its home position, the key $r$ is released, and the circuit of the trunk line is extended through the connecting cord circuit to the line of the calling subscriber. The extension of the conductors of the trunk line to the windings of the repeating coil $c^3$ in the connecting cord circuit completed a circuit for the energization of the line relay $l$ at the other end of the trunk by way of conductor 28 of the trunk, conductor 13 of the cord circuit and the interposed devices through which these conductors extend. The energization of the line relay causes its switch spring to close upon its front contact, and thus complete a circuit through the winding of the controlling relay $j$ by way of the contacts $s^{17}$ and $s^{18}$, of the cam switch, the conductors 56 and 45 and the switch contacts $k^2$ of the controlling relay $k$. The completion of this circuit causes the controlling relay $j$ to attract its switch springs against their front contacts and shift the circuits which the switch springs control. The engagement of the switch spring $j^2$ with its front contacts shifts the circuit of the power magnet so as to put it in condition to be closed upon a subsequent energization of the controlling relay $k$; the closure of the switch spring $j^3$ upon its front contact completes a local locking circuit for the controlling relay $j$, so that that relay will remain energized after the circuit is broken at the front contact of the line relay $l$; the closure of the switch spring $j^4$ upon its front contact applies current from the busy-back interrupter to the conductor 43 so that if the selected line is in use current will flow by way of the conductor 37 to conductor 29 of the trunk line and thence to conductor 14 of the connecting cord circuit to transmit a characteristic tone to the operator and the calling subscriber, and cause the intermittent illumination of the calling supervisory lamp $c^7$ to indicate that the called line is busy; and the closure of the switch spring $j^5$ upon its front contact completes a circuit which, upon a subsequent deënergization of the line relay $l$, is made active to effect the operation of the controlling relay $k$. In the the condition which now exists the calling subscriber's line is extended by way of the connecting cord circuit to one end of the trunk line, and the called subscriber's line, assuming it to be idle, has been selected and is connected to the other end of the trunk line, this end of the trunk line at this time being disconnected from the end that extends to the line of the calling subscriber, and being connected to the ringing current generator by way of the normal or resting contacts of the ringing relay $h$.

The supervisory relay $p$ of the trunk line, which is connected in the circuit over which ringing current is flowing to the called line, is adapted to be irresponsive to the alternating ringing current that passes through it while the telephone at the called substation is resting on its hook, but to respond and draw up its armature when the resistance of the circuit is reduced by the lifting of the receiver. When the called subscriber takes his telephone from its switch hook in response to the call, the supervisory relay $p$ closes its contact and completes an energizing circuit for the calling supervisory relay $c^4$ of the connecting cord circuit and for the ringing relay $h$ of the trunk by way of the conductor 14 of the connecting cord circuit, the conductor 29 of the trunk circuit and the conductors 37 and 44, including the switch contacts $m^2$ of the testing relay and the contacts of the supervisory relay $n$. The consequent energization of the calling supervisory relay $c^4$ of the connecting cord circuit extinguishes the calling supervisory lamp $c^7$, and thus indicates to the operator that the called subscriber has answered, and the energization of the ringing relay $h$ disconnects from the ringing generator Z the end of the trunk line terminating in the movable terminals of the automatic switch, and connects this end to the other end of the trunk line, thus completing a conversational circuit between the calling and the called subscribers. The energization of the ringing relay $h$ is maintained by means of another winding having an energizing circuit 46 which is closed in the contacts $h^3$ of the relay after the relay is initially energized by the response of the called subscriber. This locking circuit for the ringing relay is under the control of the line relay $l$, so that it is maintained only so long as the line relay is energized and its switch spring resting against its front contact. It serves to prevent the ringing relay from operating to apply ringing current to the line of the called subscriber when the subscriber replaces his telephone upon its hook at the end of the conversation. The lines of the two subscribers are now connected for conversation, the two supervisory lamps $c^7$ and $c^8$ associated with the cord circuit are extinguished, and the trunk lamps $f^2$ and $f^3$, associated with the multiple jacks of the trunk are lighted to guard the busy trunk against intrusion at these points. When the conversation is finished the calling subscriber by replacing his telephone on its hook causes the illumination of the lamp $c^8$, and the called subscriber by replacing his telephone causes the illumination of the lamp $c^7$ associated with the connecting cord circuit. The control of the called subscriber over the associated supervisory lamp of the connecting cord circuit is effected through the medium of the trunk supervisory relay $n$, which, when the called subscriber hangs up his receiver, breaks the circuit over which current is flowing for the energization of the calling supervisory relay of the connecting cord circuit and for the energization of the ringing relay $h$. But, as I have explained, the ringing relay also receives energizing current through its other winding, so that it does not now become inert and reapply ringing current to the line. When the operator perceives the illumination of both supervisory lamps she takes down the connection. The removal of the connecting plug from the spring jack $f$ of the trunk line breaks the circuit by means of which current has been flowing through the winding of the line relay $l$ during the continuance of the connection, and this relay, becoming inert, permits its switch spring to fall back upon its normal or resting contact. Thereupon a circuit is completed which extends by way of the conductors 52, contacts $s^{26}$, $s^{27}$ of the cam switch, upper contact $j^5$ of the controlling relay $j$, conductor 54, controlling relay $k$, resistance $k^6$, conductor 11, contacts $s^{19}$ and $s^{20}$ of the cam switch to battery D. The closure of this circuit energizes the controlling relay $k$ and causes it to attract its switch springs against their front or alternate contacts. The closure of the switch spring $k^4$ of the relay $k$ upon its front contact completes a locking circuit to maintain the energization of the relay, and the closure of the switch spring $k^3$ upon its front contact completes the circuit of the power magnet $s^{11}$, the circuit having been previously closed to this point in the switch contacts $j^2$ of the controlling relay $j$, which, it will be remembered, was energized and locked in its energized position when the circuit of the trunk line was completed to the connecting cord circuit upon the closure of the contacts $e^{27}$ of the calling device. Inasmuch as one of the windings of the connecting relay $i$ is in parallel with the winding of the power magnet, the connecting relay and power magnet are simultaneously energized, the power magnet to effect the return of the switch carriage to its normal position, and the connecting magnet to keep the movable terminals of the automatic switch disconnected from the balance of the trunk circuit during the return movement of the switch, in order that the passing of the movable terminals over the stationary terminals of other lines may have no disturbing effect upon them.

I have heretofore explained how the second energization of the power magnet causes the switch carriage to execute a movement in the reverse direction from that in which it moves when the power magnet is first energized. As the switch carriage moves toward its home position the selected movable terminals trail over the stationary terminals in the corresponding rows—but, as I have explained, without producing any disturbing effect—the cam switch operates its switch springs as the elevated portion of the cam disk passes the actuating lever of the switch, and the interrupter brush intermittently makes and breaks contact with the active interrupter segment. But the operation of these circuit controlling mechanisms during the return of the switch carriage is ineffective to interfere with the return movement or to complete any disturbing circuit. As the switch carriage arrives at the end of its return movement the roller at the end of the actuating lever of the cam switch rides down into the depression in the cam plate and permits the switch spring $s^{17}$ to separate from its associated spring $s^{18}$, and the switch spring $s^{19}$ to separate from its associated spring $s^{20}$. As it is through the contacts controlled by these sets of switch springs that the current is supplied for the energization of the various instrumentalities involved in the operation of the automatic switch S and its associated devices, the interruption of these contacts stops the return movement of the switch, and permits all of the associated relays to become inert and return to their normal positions. The automatic switch and its associated instrumentalities are thus restored to a condition in readiness to respond to another call and establish another connection.

The resistance of the windings of the various devices employed in the system described and the electromotive force of the battery may ordinarily be of any convenient value. One set of values which I have found suitable in operating this system is as follows: The central battery D, approximately 24 volts, the line relay $l$ and the stepping magnet $e^{11}$ of the calling device, each 400 ohms; the power magnet $s^{11}$, 50 ohms; the trip magnet $s^6$, 30 ohms; the controlling resistance $k^6$ in series therewith, 100 ohms; the controlling relay $j$, 100 ohms; the test relay $m$ 80 ohms; the resistance $m^3$ in series therewith, 500 ohms; the connecting relay $i$, 100 ohms in each winding; the ringing relay $h$, 100 ohms in each winding, the relay $c^6$ in the conductor 25 extending to the sleeve of the answering plug, 80 ohms; the resistance $c^{11}$ in the conductor controlled by this relay, 113 ohms; the relay $d^4$ controlling the continuity of the cord circuit and the connection of the calling device therewith, 83 ohms; the resistance $d^5$ in series with this relay 700 ohms; the relay $f^4$ that controls the illumination of the trunk busy lamp, 30 ohms. The other devices which have not been specifically mentioned in the foregoing—including the repeating coils, and the cut-off, line and supervisory relays—have resistance values and characteristics such as are usual for these parts.

For the sake of greater simplicity of illustration in the circuit diagram I have shown a number of central batteries D, and have illustrated a number of the conductors as extending directly to earth instead of to the grounded pole of the battery, but it will be understood that in practice a single central battery might properly be employed, and that the conductors mentioned above might extend directly to the return pole of the battery.

In order that this specification may constitute a clear and complete disclosure of the calling device of my invention, I have described in detail the novel system in which this device is particularly designed to be used, together with a number of novel instrumentalities designed for employment in connection with the system. These, I am not specifically claiming herein but am reserving for my other co-pending applications, Serial Numbers 418,123 and 418,126 filed February 27, 1908.

I claim:

1. A calling device, comprising a movable part, electrically actuated step-by-step mechanism controlling the movement of said part, switching mechanism comprising a plurality of contact members and a coöperating member carried by said movable part and adapted to be moved into operative relation with said contact members in the movement of said part, and means for altering the relation of said contact members to each other and to said coöperating member to change the interval between the operation thereof.

2. A calling device, comprising a movable part, electrically actuated mechanism for controlling the movement thereof, and switching mechanism adapted to be operated in the movement of said part, said switching mechanism comprising a plurality of contact members, and a coöperating actuating member carried by said movable part, said contact members being adjustable in their relation to each other and to said movable part.

3. A calling device, comprising a movable part, electrically actuated step-by-step mechanism for controlling the movement thereof, switching mechanism comprising a contact member and a coöperating actuating member carried by said movable part, and means for shifting the operative position of said contact member to correspond with the position occupied by said actuating member at any predetermined step in the movement of said movable part.

4. A calling device, comprising a movable part, electrically actuated mechanism for controlling the movement of said part, switching mechanism comprising a plurality of contact members, and a coöperating actuating member carried by said movable part and adapted to operate said contact members at predetermined intervals in the movement of said part, and means for protracting the period of operation of said contact members.

5. A calling device, comprising a movable part, electromagnetic step-by-step mechanism adapted to control the movement of said part, and a switching device adapted to have its switching lever moved from one to the other of its alternative contacts at a predetermined point in the movement of said movable part, said electro-magnet step-by-step mechanism being connected to the lever of said switching device, and being adapted in the operation of said device to have its connection shifted from one circuit to another.

6. A calling device, comprising a movable part, electro-magnetic step-by-step mechanism controlling the movement thereof, and switching mechanism comprising a switch lever resting upon a normal contact and a coöperating actuating member carried by said movable part and adapted to engage and operate said switch lever at the end of any predetermined interval after the commencement of movement of said part, said lever being provided with an alternate contact engaged when the lever is operated and being connected to said electro-magnetic step-by-step mechanism, whereby the circuit of the same is shifted from one to the other of the alternate contacts in the movement of the switch lever.

7. A calling device, comprising a movable part, electro-magnetic step-by-step mechanism controlling the movement thereof, and switching mechanism comprising a switch lever resting upon a normal contact and a coöperating actuating member carried by said movable part, and adapted to engage and lift said switch lever off of its normal contact at any predetermined interval after the commencement of movement of said part, said coöperating actuating member being adapted in its engagement with said switch lever to constitute an alternate contact for said lever.

8. A calling device, comprising a movable part, electrically actuated mechanism for controlling the movement thereof, a switching device adapted to be operated by said part at any predetermined point in the movement thereof, said switching device comprising a switch lever and normal alternate contacts therefor, an actuating circuit for said electrically actuated mechanism closed in the normal contact of said switch lever, and another actuating circuit for said electrically actuated mechanism adapted to be closed in the alternate contacts of said switch lever.

9. A calling device, comprising a movable part, electrically actuated mechanism for controlling the movement thereof, a switching device adapted to be actuated by said movable part at any predetermined point in the movement thereof, said switching mechanism comprising a lever having normal and alternate contacts, said lever being adapted to be held away from its normal contact and in engagement with its alternate contact for a protracted period during the movement of said movable part, and two actuating circuits for said electrically-actuated mechanism, one completed by way of the normal contact and the other by way of the alternate contact of the lever, whereby the movement of said movable part continues uninterrupted during the operation of said switching device.

10. A calling device, comprising an escapement wheel, means for effecting the rotation thereof, an electro-magnetic escapement adapted to control the movement of said wheel, a switch adapted to be actuated by said wheel in the movement thereof, and means for variably adjusting the relation of said wheel and switch to cause the actuation of said switch at any predetermined point in the movement of said wheel.

11. A calling device, comprising an escapement wheel, an electrically actuated escapement controlling the movement of the same, contact devices, a part carried by said wheel adapted to actuate said contact devices, and means for securing any desired relation of said contact devices to each other and to said wheel, to effect the operation of said devices at predetermined points in the movement of said wheel.

12. A calling device, comprising an escapement wheel adapted to be rotated manually in one direction, means for effecting the rotation of said wheel in the reverse direction, an electrically actuated escapement for controlling the movement of said wheel in the reverse direction, a switching device, and a part carried by said wheel and adapted to operate said switching device in the reverse movement of said wheel and means for rendering said part ineffective to operate said switching device when said wheel is rotated manually.

13. A calling device, comprising an escapement wheel adapted to be rotated in one direction manually, means for effecting the rotation of said wheel in the reverse direction, an electrically actuated escapement for controlling the rotation of said wheel in the reverse direction, a switching device adapted to be adjusted in different positions about the periphery of said wheel, and a part carried by said wheel and projecting beyond the periphery thereof adapted to engage and operate said switching device in the reverse movement of said wheel, said part being adapted to be withdrawn to prevent engagement with switching device when said wheel is rotated manually.

14. A calling device, comprising an escapement wheel, means for effecting the rotation thereof, an electrically actuated escapement for controlling the movement of said wheel, a switching device adapted to be adjusted with relation to the wheel, and a part carried by the wheel adapted to effect the operation of said switching device, said switching device being adapted to be engaged by said part and held in its operated position during several steps of the movement of said wheel.

15. A calling device, comprising an escapement wheel adapted to be rotated manually in one direction to any predetermined degree, means for causing the movement of said wheel in a reverse direction, an electrically actuated escapement adapted to control the reverse movement of said wheel, a contact device adapted to be actuated by said wheel in the reverse movement thereof, and a second contact device adapted to be operated by said wheel at the end of its reverse movement, said second contact device being adjustable in its relation to said first mentioned contact device.

16. A calling device, comprising an escapement wheel, an electrically actuated escapement for controlling the movement thereof, two contact devices associated with said wheel, a part carried by said wheel adapted in the movement thereof to operate said contact devices one after the other, means for adjusting the relative positions with respect to each other of said operating part and said contact devices, and indicating means adapted to show the positions of adjustment of said operating part and said contact devices with relation to each other.

17. A calling device comprising a movable part, automatic means for moving said part in one direction, manual means for moving said part in the other direction to variably set said part for operation, and stop means arranged to the set to variably limit the movement of said part while driven by said automatic means.

18. A calling device comprising a movable part, automatic means for moving said part in one direction, manual means for moving said part in the other direction to variably set said part for operation, stop means arranged to be set to variably limit the movement of said part while driven by said automatic means, and switching mechanism operated by said part in such movement.

19. A calling device comprising a movable part, automatic means for moving said part in one direction, manual means for moving said part in the other direction to variably set said part for operation, stop means arranged to be set to variably limit the movement of said part while driven by said automatic means, and switching mechanism adapted to be operated by said part at a definite point in such movement.

20. A calling device comprising a movable part, automatic means for moving said part in one direction, manual means for moving said part in the other direction to variably set said part for operation, switching mechanism adapted to be operated by said part at a definite point in its movement under the control of said automatic means, stop means arranged to be set to variably limit the movement of said part in such movement, and additional switching mechanism associated with said stop mechanism adapted to be operated by said part in its movement under the control of said electromagnetic mechanism at a point having a fixed relation to the position of said stop means.

FRANK R. McBERTY.

Witnesses:
NICHOLAS E. KERNAN,
WILLIAM G. McKNIGHT.

---

Copies of this patent may be obtained for five cents each, by addressing the "Commissioner of Patents, Washington, D. C."